(12) United States Patent
Banwell et al.

(10) Patent No.: US 6,285,722 B1
(45) Date of Patent: Sep. 4, 2001

(54) METHOD AND APPARATUS FOR VARIABLE BIT RATE CLOCK RECOVERY

(75) Inventors: Thomas C. Banwell, Madison; Nim K. Cheung, Shorts Hills, both of NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/199,480

(22) Filed: Nov. 25, 1998

Related U.S. Application Data

(60) Provisional application No. 60/067,397, filed on Dec. 5, 1997.

(51) Int. Cl.[7] .................................................. H04L 7/00
(52) U.S. Cl. ............................................. 375/354; 327/165
(58) Field of Search .................................. 375/377, 324, 375/316, 326, 327, 354, 360, 225, 224, 359; 370/518; 327/291, 26, 37, 165

(56) References Cited

U.S. PATENT DOCUMENTS

| | | | |
|---|---|---|---|
| 3,959,601 | 5/1976 | Olevsky et al. | 178/69.5 |
| 4,339,817 | 7/1982 | Hata et al. | 370/93 |
| 4,365,210 | 12/1982 | Harrington et al. | 331/1 A |
| 4,590,602 | 5/1986 | Wolaver | 375/120 |
| 4,615,041 | 9/1986 | Koskinen | 375/365 |
| 4,667,333 | 5/1987 | Butcher | 375/355 |
| 4,707,841 | 11/1987 | Yen et al. | 375/230 |
| 4,726,904 | 2/1988 | Acampora | 375/316 |
| 4,849,998 | 7/1989 | Poklemba | 375/121 |
| 4,891,598 | 1/1990 | Yoshida et al. | 327/156 |
| 4,926,447 | 5/1990 | Corsetto et al. | 375/376 |
| 4,943,788 | 7/1990 | Laws et al. | 331/11 |
| 5,175,512 | 12/1992 | Self | 331/57 |
| 5,204,882 | 4/1993 | Chao et al. | 375/354 |
| 5,208,659 | 5/1993 | Rhodes | 348/479 |
| 5,300,898 | 4/1994 | Chen et al. | 331/57 |
| 5,402,448 | 3/1995 | Marko et al. | 375/340 |
| 5,438,621 | 8/1995 | Hornak et al. | 380/43 |
| 5,483,372 | * 1/1996 | Green, Jr. | 359/173 |
| 5,537,442 | 7/1996 | Nakamura et al. | 375/330 |
| 5,550,864 | 8/1996 | Toy et al. | 375/293 |
| 5,566,204 | 10/1996 | Kardontchik et al. | 375/219 |
| 5,594,762 | 1/1997 | Joo et al. | 375/371 |
| 5,596,302 | 1/1997 | Mastrocola et al. | 331/57 |
| 5,606,317 | 2/1997 | Cloonan et al. | 341/58 |
| 5,627,845 | * 5/1997 | Asano et al. | |
| 5,635,879 | 6/1997 | Sutardja et al. | 331/57 |
| 5,642,386 | 6/1997 | Rocco, Jr. | 375/355 |
| 5,671,258 | 9/1997 | Burns et al. | 375/359 |
| 5,689,530 | 11/1997 | Honaker, Jr. | 375/286 |
| 5,696,800 | 12/1997 | Berger | 375/361 |

* cited by examiner

*Primary Examiner*—Chi Pham
*Assistant Examiner*—Jean Corrielus
(74) *Attorney, Agent, or Firm*—Joseph Giordano; Orville Cockings

(57) ABSTRACT

Methods and apparatuses consistent with the present invention recover a clock signal from a variable bit rate data signal by estimating, in the time domain, the bit rate of the data signal, and based on the estimated variable bit rate, determining a center frequency of a narrow-band filter for extracting the clock signal from the data signal. A clock recovery circuit consistent with the present invention extracts a clock signal from a variable bit rate data signal by estimating a minimum time interval between transitions in the data signal, generating a plurality of pulses that correspond respectively to transitions in the data signal, adjusting the duration of each of the pulses based on the estimated minimum time interval and inputting into a narrow-band filter the adjusted pulses, determining a center frequency of the narrow-band filter based on the estimated minimum time interval, and extracting in the narrow-band filter the clock signal from the adjusted pulses.

21 Claims, 14 Drawing Sheets

METHOD AND APPARATUS FOR VARIABLE BIT RATE CLOCK RECOVERY

CROSS-REFERENCE TO RELATED APPLICATIONS

This application claims the benefit of U.S. Provisional Application No. 60/067,397, filed Dec. 5, 1997, the contents of which are hereby incorporated in their entirety by reference.

BACKGROUND OF THE INVENTION

1. Field of the Invention

The present invention relates generally to recovering timing clock of signals in communication networks, and more particularly, to methods and apparatuses for recovering timing clock of variable bit rate signals in communication networks.

2. Background of the Art

High reliability networks, which handle diverse types of traffic from diverse sources, monitor and manage in the time domain the quality of digital transmission. Failure to detect and correct transmission impairments results in unacceptable link error rates and unexpected network failures. Hence, networks must extract from a stream of transmitted data a clock signal to perform the necessary measurements and correct for inevitable transmission degradation.

An extracted clock signal is necessary to perform time domain measurements, such as eye-pattern opening and timing jitter. The extracted clock signal is also essential for distinguishing the individual data bits in the transmitted data stream prior to further processing, such as digital demultiplexing, protocol conversion, packet switching, and measurement of bit error rate (BER).

Clock recovery has traditionally been regarded as a rate specific process, and as a result, conventional point-to-point transmission systems typically use only one or two line rates. Emerging network technologies, for example photonic switching and Wavelength Division Multiplexing (WDM), however, have enabled complex optical network topologies, where links transport diverse types of traffic, such as Internet Protocol (IP), Asynchronous Transfer Mode (ATM), Fiberchannel, Synchronous Optical Network (SONET), and Gigabit Ethernet. Hence, these emerging networks must use clock recovery circuits that are adaptive to the variable rate of the transmitted data.

A phase locked loop is one type of tracking filter often used in a clock recovery circuit for extracting a clock signal from an input data signal. FIG. 1 illustrates the primary components of a prior art clock recovery circuit 100, which includes a phase locked loop. The phase locked loop includes a phase comparator 120, low pass filter 130, a stable voltage controlled oscillator 150 (VCO), and feedback loop 165.

As shown, a transition detector 110, for example a dual edge triggered one-shot, receives a non-return to zero (NRZ) input signal 155, and generates a single pulse of duration $\tau_{ED}$ for each transition in input signal 155. The phase locked loop, whose passband frequency $f_c$ is centered on the bit rate frequency $f_{bit}$ of input signal 155, extracts the clock signal from the stream of pulses generated by transition detector 110. Phase comparator 120 compares the phase of the signal at the output of the phase locked loop with the stream of pulses, and generates a phase difference signal. Low pass filter 130 filters and amplifies the phase difference signal to generate a correction signal for adjusting the phase of VCO 150.

For a variable bit rate NRZ input signal, two rate dependent parameters must be properly adjusted in clock recovery circuit 100 for recovering an associated clock signal 160. One rate dependent parameter is the width $\tau_{ED}$ of the pulses generated by transition detector 110. While input signal 155 generally does not contain energy at its bit rate frequency $f_{bit}$, the series of pulses generated by transition detector 110 does contain energy at the bit rate frequency $f_{bit}$. The amount of energy at the bit rate frequency $f_{bit}$ is maximum when the width of the generated pulses $\tau_{ED}$ equals $1/(2f_{bit})$.

The center frequency of VCO 150 is the second rate dependent parameter, which must be properly set to recover clock signal 160 from input signal 155. An active or passive stabilization signal 170 initially sets the center frequency of VCO 150 to a value $f_c$ in the absence of a signal from phase comparator 120. Feedback loop 165 causes the center frequency of VCO 150 to shift from the initial frequency $f_c$ to the bit rate frequency $f_{bit}$ of input signal 155. VCO 150 will lock to the bit rate frequency $f_{bit}$ when its center frequency is close to the bit rate frequency $f_{bit}$. When the center frequency of VCO 150 exactly equals the bit rate frequency $f_{bit}$, VCO 150 will phase lock to transitions in input signal 155.

In addition to a phase locked loop, clock recovery circuits may also include a frequency locked loop for tuning the center frequency $f_c$ of VCO 150 to the bit rate frequency $f_{bit}$. FIG. 2 illustrates the basic components of a clock recovery circuit 200, which includes a transition detector 210, phase comparator 220, frequency comparator 260, low pass filter 230, and VCO 250. Frequency comparator 220 compares the stream of pulses generated by transition detector 210 with the output of VCO 250, and generates a locking signal that reflects the difference between the center frequency of VCO 250 and the bit rate frequency $f_{bit}$. An adder 270 combines the locking signal with the output of phase comparator 220. Feedback loop 265 causes the center frequency of VCO 250 to shift from its initial value of $f_c$ to the bit rate frequency $f_{bit}$, causing the locking signal to transition to zero. At this point, phase comparator 120 continues to control the center frequency and phase of VCO 250.

The stream of pulses generated by transition detector 210 also contains at multiples of the bit rate frequency $f_{bit}$ energy, whose relative amplitude increases as $\tau_{ED}$ decreases. As a result, regular patterns in block coded input signals may produce both harmonics and sub-harmonics of the bit rate frequency $f_{bit}$. Accordingly, existing clock recovery circuits track the harmonics or sub-harmonics of the input data signal when the center frequency of VCO 250 is inappropriately set to a multiple of the bit rate frequency $f_{bit}$. Consequently, false locking may occur when a clock recovery circuit searches for the bit rate frequency $f_{bit}$ by sweeping the center frequency of VCO 250 across the harmonics. In addition, recurrent patterns in common block coded input data signals also increase the susceptibility of a clock recovery circuit to sub-harmonic locking.

Although various techniques are known for sweeping the center frequency of VCO 250 to determine the bit rate frequency $f_{bit}$, these techniques are too slow and/or lack sufficient accuracy for variable bit rate applications. One example of variable bit rate applications is Wavelength Division Multiplexing (WDM), where an input data signal can have a wide range of bit rates. In addition, the existing techniques cause a clock recovery circuit to readily lock to harmonics and sub-harmonics of the bit rate frequency $f_{bit}$.

Thus, it is desirable to have methods and apparatuses that do not have the above-mentioned and other disadvantages of the prior art clock recovery circuits for recovering a clock signal from a variable bit rate input data signal.

DESCRIPTION OF THE INVENTION

Methods and apparatuses consistent with the present invention recover a clock signal of a variable bit rate data signal by estimating the minimum time interval between transitions in the data signal, and based on the estimated minimum time interval, determining a center frequency of a narrow band filter that extracts the clock signal from the data signal. For example, a clock recovery circuit consistent with the present invention extracts the clock signal from the variable bit rate data signal by estimating a minimum time interval between transitions in the data signal. The clock recovery circuit generates a plurality of pulses that correspond to transitions in the data signal, and adjusts the duration of each of the pulses based on the estimated minimum time interval. The clock recovery circuit inputs into a narrow band filter the adjusted pulses, determines a center frequency of the narrow band filter based on the estimated minimum time interval, and extracts in the narrow-band filter the clock signal from the adjusted pulses.

Methods and apparatuses consistent with the invention estimate the bit rate of a data signal independently of a primary phase locked loop and frequency locked loop. Such methods and apparatuses directly estimate the minimum time interval between transitions in the data signal, and thus, eliminate the problems of harmonic and sub-harmonic locking that the prior art clock recovery circuits exhibit in variable bit rate applications.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Variable Bit Rate Clock Recovery

Figure 1:
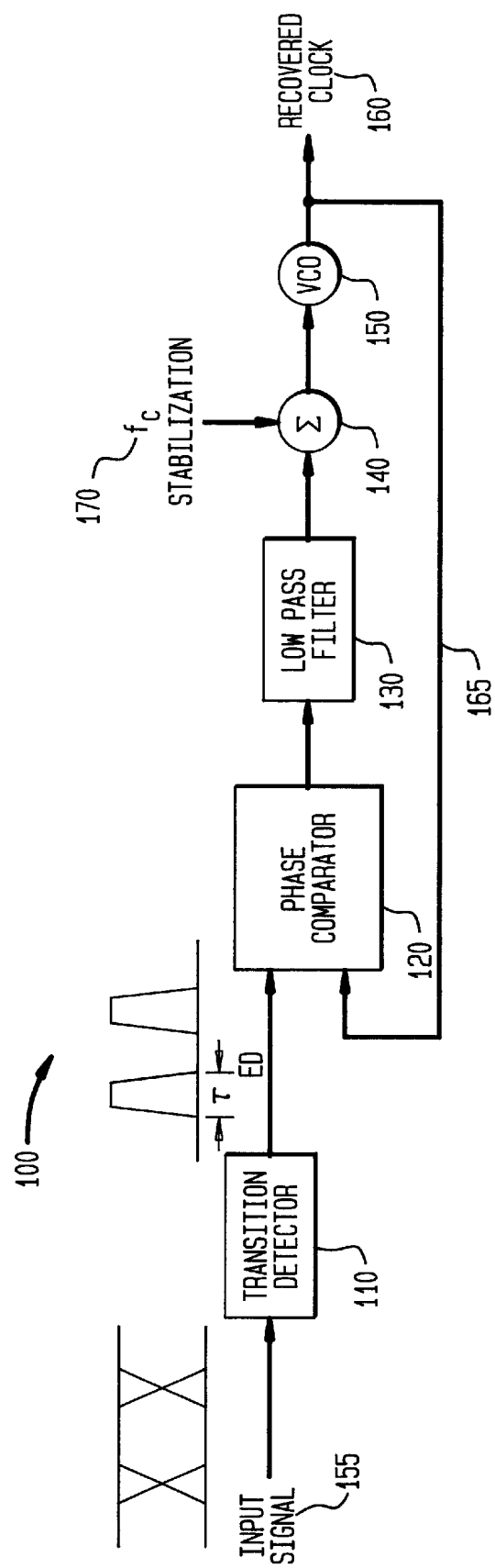
FIG. 1 is a block diagram of a prior art clock recovery circuit, which includes a phase locked loop.
Figure 2:
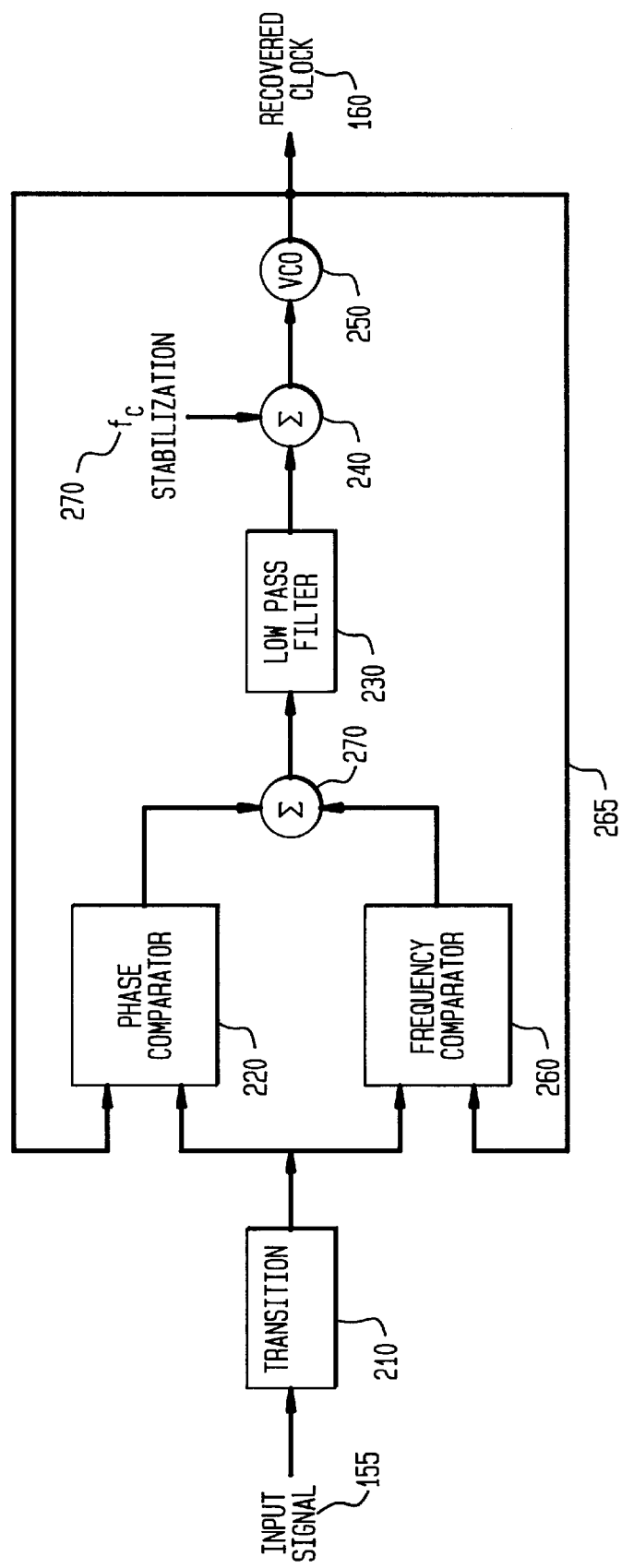
FIG. 2 is a block diagram of a prior art clock recovery circuit, which includes a frequency locked loop and a phase locked loop.
Figure 3:
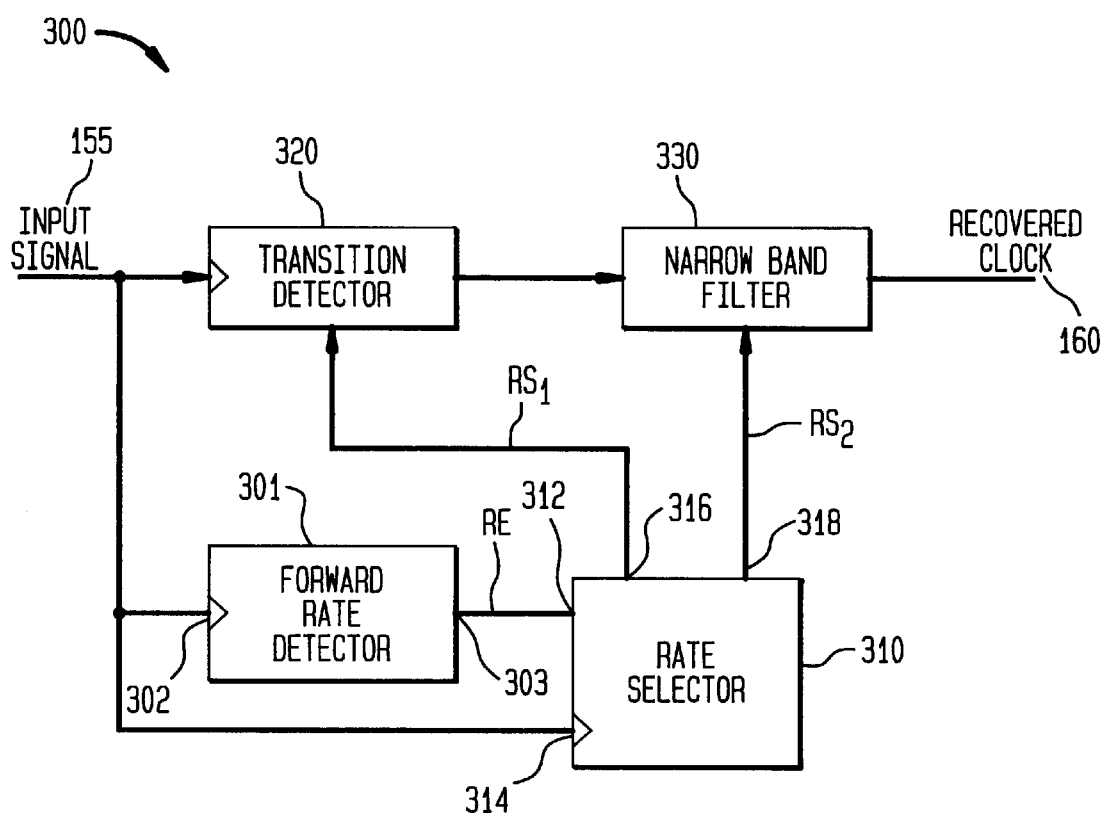
FIG. 3 is a block diagram of a variable bit rate clock recovery circuit, in accordance with an embodiment of the invention.

FIG. 3 is a block diagram of a variable bit rate clock recovery circuit 300, in accordance with an embodiment of the invention. Clock recovery circuit 300 comprises forward rate detector 301, rate selector 310, transition detector 320, and narrow band filter 330. Clock recovery circuit 300 includes a programmable clock extraction path and a rate selection path. The clock extraction path includes transition detector 320 and narrow band filter 330. The rate selection path includes forward rate detector 301 and rate selector 310.

Transition detector 320 and forward rate detector 301 receive a variable bit rate input data signal 155. From input signal 155, transition detector 320 generates a pulse in response to each transition in input signal 155. Likewise, forward rate detector 301 estimates the minimum time interval between transitions in input signal 155, and generates a rate estimate signal RE. Rate selector 310 then converts the rate estimate signal RE into control signals $RS_1$ and $RS_2$, which set the width $\tau_{ED}$ of the pulses generated by transition detector 320 and the center frequency $f_c$ of narrow band filter 330, respectively. Rate selector 310 may set $\tau_{ED}$ and $f_c$ to, for example, $1/(2\,f_{bit})$ and $f_{bit}$, respectively. When rate selector 310 sets the appropriate $\tau_{ED}$ and $f_c$, narrow band filter 330 extracts clock signal 160 from the stream of pulses.

Rate estimate signal RE may be represented as follows:

$$RE = f_{bit} \cdot K_{frd}(f_{bit}), \qquad (1)$$

where $f_{bit}$ is the bit rate frequency of input signal 155 and $K_{frd}$ is either a constant or a slowly varying function of $f_{bit}$. The pulse width $\tau_{ED}$ from the transition detector 320 may be represented as follows:

$$\frac{1}{\tau_{ED}} = K_{ED}(RS_1), \quad (2)$$

where $K_{ED}$ is a monotonic function of control signal $RS_1$. The center frequency $f_c$ of the narrow band filter 330 may be represented as follows:

$$f_c = K_{fc}(RS_2), \quad (3)$$

where $K_{fc}$ is a monotonic function of control signal $RS_2$. In one embodiment, rate selector 310 may perform a one-to-one mapping of rate estimate signal RE to predetermined values of $\tau_{ED}$ and $f_c$ as follows:

$$RS_1 = G_1(RE), \quad (4)$$

where $G_1$ is a monotonic function of rate estimate signal RE and satisfies the relation:

$$K_{fc}^{-1} f_{bit} = G_1(f_{bit} \cdot K_{frd}(f_{bit})), \quad (5)$$

and $$RS_2 = G_2(RE), \quad (6)$$

where $G_2$ is a monotonic function of rate estimate signal RE and satisfies the following relation:

$$K_{ED}^{-1}(2 f_{bit}) = G_2(f_{bit} \cdot K_{frd}(f_{bit})) \quad (7)$$

In one embodiment, $K_{ED}$ and $K_{fc}$ may have an approximately linear dependence on rate estimate signal RE, whereas $K_{frd}$ may be nearly constant. In this embodiment, the solutions to equations (5) and (7) may be represented as follows:

$$G_1(RE) = g_{11} + g_{12} RE + \epsilon_1(RE), \quad (8)$$

$$G_2(RE) = g_{21} + g_{22} RE + \epsilon_2(RE), \quad (9)$$

where $g_{11}$, $g_{12}$, $g_{21}$, and $g_{22}$ are parameters, which may depend on temperature or the interval of rate estimate signal RE. Similarly, the functions $\epsilon_1$ (RE) and $\epsilon_2$ (RE) may be slowly varying functions of rate estimate signal RE and temperature. The parameters $g_{11}$, $g_{12}$, $g_{21}$, $g_{22}$, $\epsilon_1$, and $\epsilon_2$ may be selected to satisfy, for example, equations (5) and (7). Alternatively, $\epsilon_1$ and $\epsilon_2$ may be set to zero.

Figure 4:
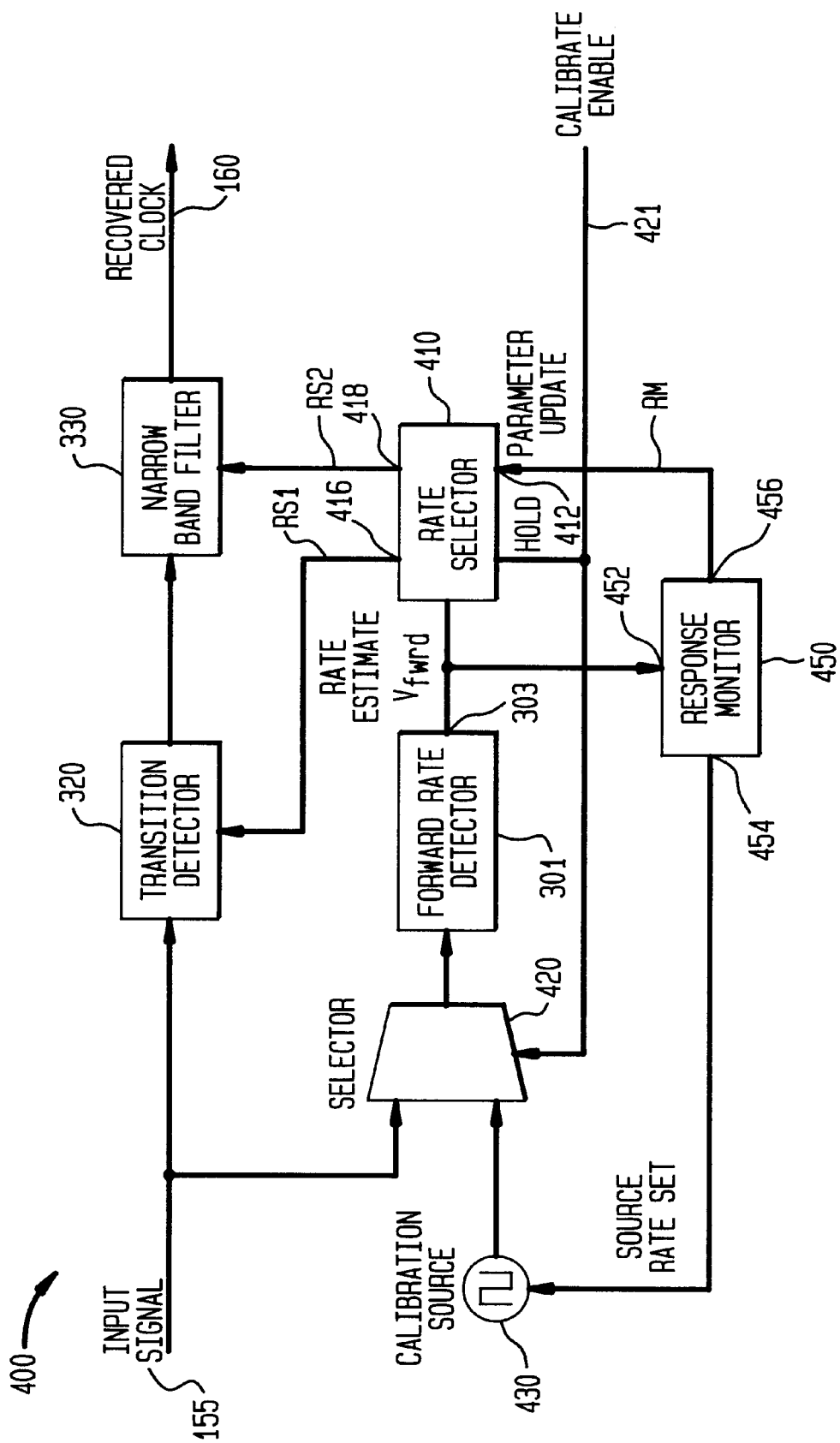
FIG. 4 is a block diagram of a variable bit rate clock memory circuit, which includes a calibration means, in accordance with an embodiment of the invention.

FIG. 4 is a block diagram of variable bit rate clock recovery circuit 400, which includes a calibration means, in accordance with an embodiment of the invention. Clock recovery circuit 400 comprises forward rate detector 301, rate selector 410, transition detector 320, and narrow band filter 330, selector 420, programmable calibration source 430, and response monitor 450. Calibration source 430 generates, for example, a "1010" signal pattern with predetermined bit rates $f_{ref}$, for example, $(1/m) \times 2488$ MHz, where m is a programmable integer between 1 and 32, inclusive. Response monitor 450 generates a first control signal at output 454 which controls the particular value of frequency $f_{ref}$ from calibration source 430.

Selector 420, which is controlled by calibration enable line 421, receives input signal 155 and calibration source 430 at input ports 422 and 424, respectively. Rate selector 410 accepts rate estimate RE from forward rate detector 301 and outputs control signal $RS_1$ for controlling transition detector 320 and control signal $RS_2$ for controlling narrow band filter 330. Calibrate enable line 421 activates the calibrate mode, at which time selector 420 connects calibration source 430 to forward rate detector 301, while outputs 416 and 418 of rate selector 410 are locked at their current values. This inhibits incidental changes in the clock extraction path, which includes transition detector 320 and narrow band filter 330.

Response monitor 450 receives at input 452 a rate estimate signal RE from output 303 of forward rate detector 301. In auto-calibrate mode, response monitor 450 compares rate estimate signal RE with each predetermined bit rate $f_{ref}$. Response monitor 450 generates, at output 456, a second control signal RM, which corresponds to the difference between rate estimate signal RE and a predetermined bit rate $f_{ref}$. Rate selector 410 receives control signal RM at parameter update input 412, and based on control signal RM, adjusts, for example, its rate selection algorithm or entries in a look-up table for setting control signals $RS_1$ and $RS_2$. For example, rate selector 410 may use parameters $g_{11}$, $g_{12}$, $g_{21}$, $g_{22}$ and/or functions $\epsilon_1$ and $\epsilon_2$ to adjust mappings of $G_1$ and $G_2$ in equations (8) and (9).

Discrete Forward Rate Detector

The time interval between transitions in input signal 155 may be represented as $\Delta t = n \tau_{bit}$ where n is an integer greater than or equal to 1 and $\tau_{bit}$ is the bit period of input signal 155. In other words, $\tau_{bit}$ is equal to the multiplicative inverse of bit rate frequency $f_{bit}$ of input signal 155. Forward rate detector 301 may estimate the bit rate in input signal 155 from a plurality of consecutive transitions in input signal 155, which would represent a set $\{n\}$ of values for run length n. From this set of transitions, forward rate detector 301 may determine the minimum detected interval between transitions $\tau_{min}$, which may be represented as follows:

$$\tau_{min} = \min_{\{n\}} \Delta t.$$

Furthermore, $\tau_{min}$ may represent an unbiased estimate of the bit rate $\tau_{bit}$ as follows:

$$\lim_{P(n \neq 1) \to 0} \tau_{min} = \tau_{bit}.$$

Digital signals such as input signal 155 may have random bit patterns or may have prescribed bit patterns constrained by block coding. For a random sequence of bits, the discrete probability density for run length n is $P(n) = 2^{-n}$. The run length distribution for signals, which are encoded using block coding, may also be approximately $2^{-n}$ for small values of n, for example n<5. This indicates that single bit intervals with n=1 occur quite often with these types of digital signals, for example about 50% of the time. Based on the high incidence of single bit intervals in input signal 155, forward rate detector 301 may rapidly and reliably estimate $f_{bit}$ from measurements of $\tau_{min}$. In addition, the preamble of a packet represented by input signal 155 may include a "1010" pattern, allowing nearly instantaneous detection of the rate of input signal 155.

Figure 5:
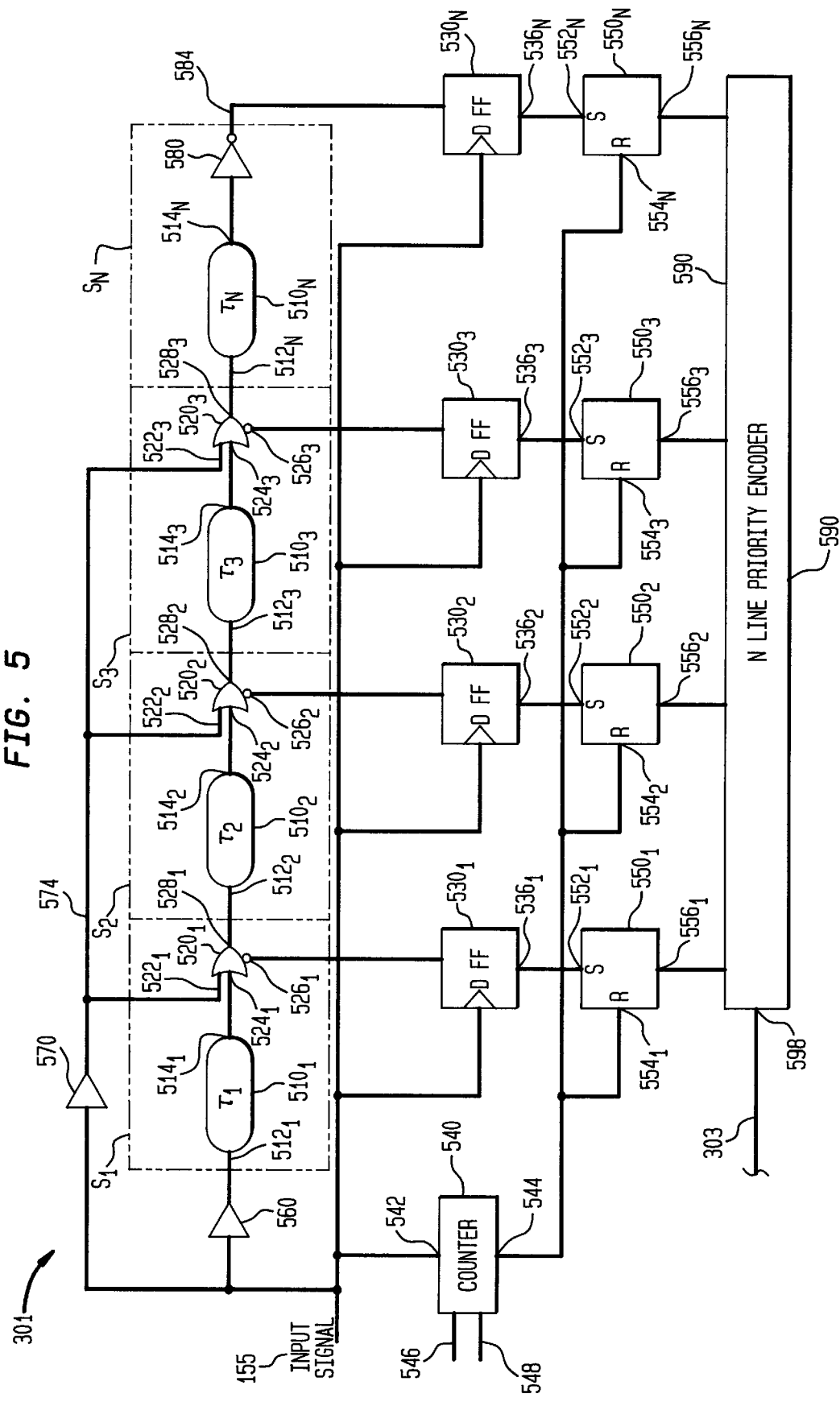
FIG. 5 is a circuit diagram of a forward rate detector, which performs discrete interval pulse-width auto-correlation, in accordance with an embodiment of the invention.

FIG. 5 shows a circuit diagram of forward rate detector 301, which performs discrete interval pulse-width autocorrelation, in accordance with an embodiment of the invention. As shown, forward rate detector 301 comprises N gated delay segments $S_1$ through $S_N$, rising-edge-triggered D-type flip-flops $530_1$ through $530_N$, R-S latches $550_1$ through $550_N$, buffers 560 and 570, counter 540, and an N-line priority encoder 590, where N is an integer greater than one.

Delay segments $S_1$–$S_N$ connect to each other in serial fashion, where each delay segment $S_1$–$S_N$ successively delays by time $\tau_i$ the falling edge initiated by input signal 155, where $1 \leq i \leq N$. Depending upon the embodiment, the particular values of $\tau_i$ may differ between delay segments $S_1$–$S_N$. As shown in FIG. 5, delay segments $S_1$–$S_3$ include resettable falling edge triggered delay elements $510_1$–$510_3$ and OR/NOR gates $520_1$–$520_3$, respectively. Outputs of each edge triggered delay elements $510_1$–$510_3$ connect to a respective first input $524_1$–$524_3$ of OR/NOR gates $520_1$–$520_3$. The last delay segment $S_N$, however, includes delay element $514_N$ and an inverter 580 instead of an OR/NOR gate.

Buffer 560, which receives input signal 155, drives delay segment $S_1$. Delay segment $S_1$ includes delay element $510_1$, whose output $514_1$ is sensed by a first input to OR/NOR gate $520_1$, which includes complementary output $526_1$ and output $528_1$. Output $528_1$ of OR/NOR gate $520_1$ drives the next delay segment $S_2$. Accordingly, the falling edge transition of input signal 155 passes consecutively through each of delay segments $S_1$–$S_N$. For example, delay element $510_1$ delays output $528_1$ of delay segment $S_1$ by time $\tau_1$, and delay elements $510_1$ and $510_2$ delay output $528_2$ of delay segment $S_2$ by time $\tau_1 + \tau_2$. Hence, the total delay through k delay segments may be represented as $$\sum_{i=1}^{k} \tau_i.$$

As the input transition propagates through delay segments $S_1$–$S_N$, consecutive outputs $528_1$–$528_3$ may transition from a high state to a low state, while the corresponding complementary outputs $526_1$–$526_3$ and 584 may transition from a low state to a high state. Each falling edge transition in input signal 155 initiates a series of pulses, which are then compared to the arrival of a subsequent rising transition in input signal 155. D-type flip-flops $530_1$–$530_N$ perform the comparison by latching the state of delayed outputs $526_1$–$526_N$ and 584 upon the subsequent rising transition in input signal 155.

R-S latches $550_1$–$550_N$ receive and store the state of D-type flip-flop outputs $536_1$–$536_N$ via "SET" inputs $552_1$–$552_N$, respectively. Outputs $556_1$–$556_N$ of R-S latches $550_1$–$550_N$ connect to inputs $595_1$–$595_N$ of N-line priority encoder 590, which generates at output 598 the binary equivalent of the number of active outputs $536_1$–$536_N$.

Clock input 542 of counter 540 connects to input signal 155. Counter 540 generates at output 544 a pulse, which resets R-S latches $550_1$–$550_N$ after a preset number of transitions, for example 32, in input signal 155.

High speed operation is achieved by partitioning the net time delays into small intervals $\tau_1$–$\tau_N$, and simultaneously resetting each delay element $510_2$–$510_N$ via common control line 574 of buffer 570. Buffer 570 delays the simultaneous reset signal, such that the minimum hold-time requirement of D-type flip-flops $530_1$–$530_N$ is satisfied.

Operation of forward rate detector 301 may be initiated on the rising edge transitions in input signal 155 as well as the falling edge transitions in input signal 155. Forward rate detector 301 may, for example, include a duplicate circuit, which is driven by an inverted replica of input signal 155, for sensing the length of each pulse in input signal 155 following a rising transition in input signal 155.

Figure 6A:
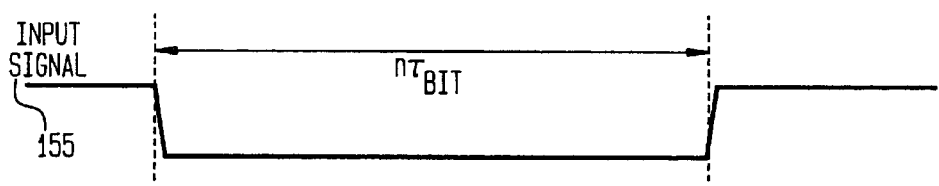
FIGS. 6a, 6b, 6c, 6d, and 6e illustrate timing diagrams of an input signal as it propagates through a set of delay segments, in accordance with an embodiment of the invention.
Figure 6B:
Figure 6C:
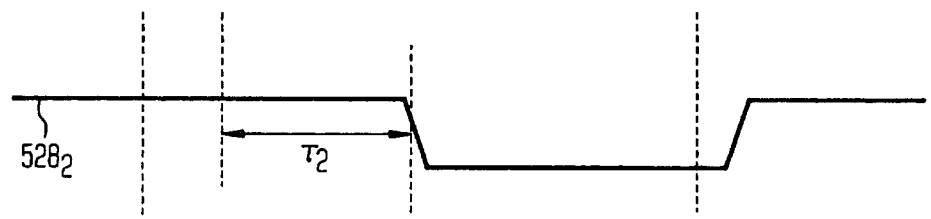

FIGS. 6a–e illustrate timing diagrams of input signal 155 as it propagates through delay segments $S_1$–$S_N$, in accordance with an embodiment of the invention. FIGS. 6a–c show a falling edge transition in input signal 155 as it propagates through delay segments $S_1$–$S_N$. At the end of a pulse in input signal 155, the delayed edge may pass through a portion or all of delay segments $S_1$–$S_N$. Because a pulse with the shortest duration in input signal 155 would pass through the fewest number of delay segments $S_1$–$S_N$, output $528_k$ of the $k^{th}$ delay segment $S_k$ is at a high state when the sum of delay times $\tau_i$ satisfies the constraint $$n\tau_{bit} < \sum_{i=1}^{k} \tau_i,$$

where $\tau_{bit}$ equals the multiplicative inverse of the bit rate frequency $f_{bit}$ of input signal 155.

Figure 6D:
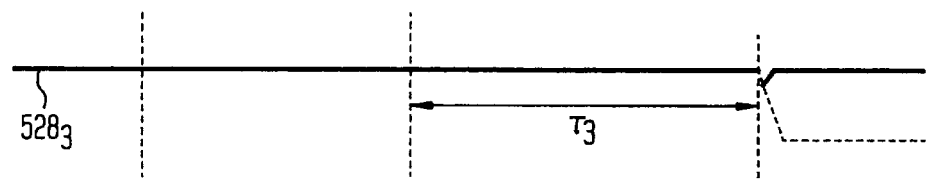
Figure 6E:
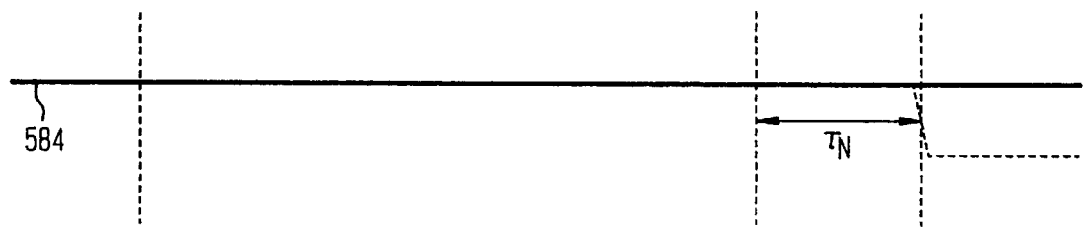

As shown in FIGS. 6b–e, outputs $528_1$ and $528_2$ of delay segments $S_1$ and $S_2$, respectively, are activated within the $n\tau_{bit}$ period of input signal 155, whereas outputs $528_3$ and 584 of delay segments $S_3$ and $S_N$ are not activated within that time period. The waveforms indicated by the dashed lines in FIGS. 6d–e show the state of outputs $528_3$ and 584, respectively, for an input pulse of longer duration. After a small number of transitions input signal 155, depending on the run length distribution P(n), a pulse with n=1 appears in the input signal 155, after which time the state of outputs $556_1$–$556_N$ represents an upper and lower bound on $\tau_{bit}$. The state of outputs $556_1$–$556_N$ tracks increasing and decreasing values of $\tau_{bit}$ when the pulses from counter 540, for example, occasionally reset R-S latches $550_1$–$550_N$. Priority encoder 590 derives at output 598 a binary representation of $\tau_{bit}$ from the state of outputs $556_1$–$556_N$. This binary representation of $\tau_{bit}$ is rate estimate signal RE, which is uniquely determined by $\tau_{bit}$ and the particular values of $\tau_1$–$\tau_N$. The resolution of the estimate of $\tau_{bit}$ may be improved by performing multiple scans with different combinations of values for $\tau_1$–$\tau_N$.

Table 1 lists several common line rates in input signal 155 and the segmental delays $\tau_i$, which may be used to distinguish between the line rates. The first two columns list some common line rates $f_{bit}$ and the corresponding bit interval $\tau_{bit}$ for input signal 155, respectively. The third column lists the net delays for distinguishing between consecutive rates, which is the average of $\tau_{bit}$ for two consecutive rates. Since the net delay through k delay segments may be represented as $$\sum_{i=1}^{k} \tau_i,$$

the segmental delays $\tau_i$ represent the differences between the net delays listed in the third column. The segmental delays, which are listed in the fourth column and may be readily achieved, demonstrate the feasibility of discrete rate detector 301 for operating over a wide range of line rates.

TABLE 1

| Line Rate $f_{bit}$ (MHz) | Period $\tau_{bit}$ (nsec) | Net Delay | Segmental Delay $\tau_i$ (nsec) |
|---|---|---|---|
| 2488.32 | 0.402 | — | — |
| 1250 | 0.800 | 0.601 | — |
| 1065 | 0.939 | 0.870 | 0.269 |
| 800 | 1.250 | 1.095 | 0.225 |
| 622.08 | 1.608 | 1.429 | 0.334 |
| 531 | 1.833 | 1.746 | 0.317 |

TABLE 1-continued

| Line Rate $f_{bit}$ (MHz) | Period $\tau_{bit}$ (nsec) | Net Delay | Segmental Delay $\tau_i$ (nsec) |
|---|---|---|---|
| 265 | 3.744 | 2.829 | 1.083 |
| 194 | 5.144 | 4.459 | 1.630 |
| 155.52 | 6.430 | 5.787 | 1.328 |
| 132.5 | 7.547 | 6.989 | 1.202 |
| 125 | 8.000 | 7.774 | 0.785 |
| 51.84 | 19.29 | 13.645 | 5.871 |

Delay Segment

Figure 7:
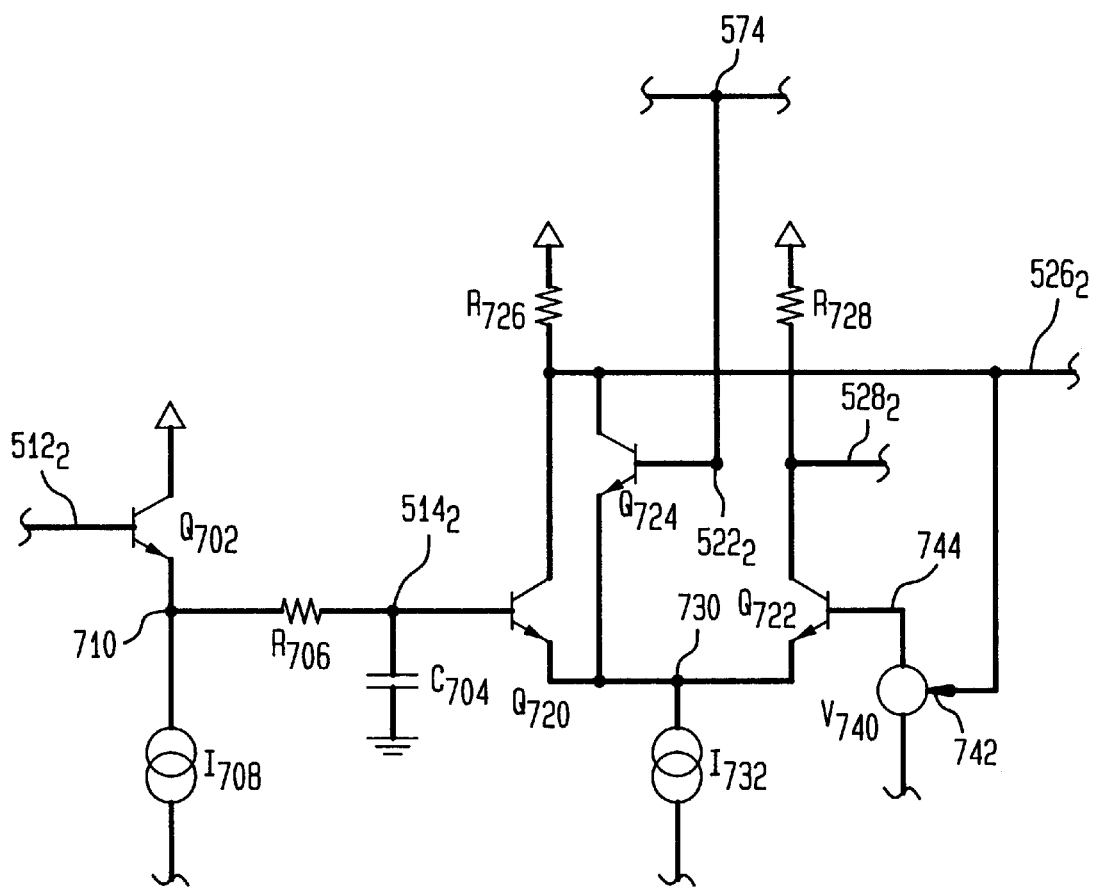
FIG. 7 is a circuit diagram of a delay segment, in accordance with an embodiment of the invention.

FIG. 7 is a circuit diagram of delay segment $S_2$ (shown in FIG. 5), in accordance with an embodiment of the invention. Although FIG. 7 shows a circuit diagram of delay segment $S_2$, generalization to delay segments $S_1$ and $S_3$–$S_N$ is readily apparent. High speed performance may be optimized by merging the threshold function found in a traditional implementation of delay circuit $510_2$ with OR/NOR gate $520_2$ using a gated differential amplifier. Input $512_2$ of delay segment $S_2$ drives the base of transistor $Q_{702}$, which serves as a voltage follower. The emitter of $Q_{702}$ and a programmable current source $I_{708}$ connect to capacitor $C_{704}$ at output $514_2$ through resistor $R_{706}$. Current from the emitter of $Q_{702}$ rapidly charges $C_{704}$ to a preset value while the current from $I_{708}$ discharges $C_{704}$ at a controlled rate. The voltage at output $514_2$ is sensed by a gated differential amplifier, which includes $Q_{720}$ and $Q_{722}$. The bases of $Q_{720}$ and $Q_{722}$ connect to output $514_2$ and to a reference voltage $V_{740}$, respectively. The emitters of transistors $Q_{720}$ and $Q_{722}$ connect via node 730 to a fixed current source $I_{730}$.

The base of a gating transistor $Q_{724}$ connects to common control line 574 via second input $522_2$. The collector and emitter of $Q_{724}$ connect to output $526_2$ and node 730, respectively. The amplifier has inverting and non-inverting outputs at outputs $526_2$ and $528_2$, respectively. Output $528_2$, which connects to the collector of $Q_{722}$, is obtained from the voltage drop across $R_{728}$. Output $526_2$, which connects to the collectors of $Q_{720}$ and $Q_{724}$, is obtained from the voltage drop across $R_{726}$. The value of reference $V_{740}$ may be altered by positive feedback via control node 742, which connects to output $526_2$ to provide threshold level hysteresis. A voltage greater than that set by reference $V_{740}$ at either output $514_2$ or common control line 574 forces output $526_2$ to a low state and output $528_2$ to a high state. In the last delay segment $S_N$, the gating transistor corresponding to $Q_{724}$ may be omitted.

In the initial quiescent state, input $512_2$ and common control line 574 may be at a high state, and output $526_2$ may be at a low state. In this state, the high signal on input $512_2$ controls $Q_{702}$ to preset the voltage across capacitor $C_{704}$. A high signal at common control line 574 activates $Q_{724}$ and forces output $528_2$ to drive the next delay segment $S_3$ to a high state even before the voltage on $C_{704}$ reaches the preset value. When input signal 155 transitions from a high state to a low state, common control line 574 goes low and turns $Q_{724}$ off. The initial state is held by the preset voltage across $C_{704}$, which controls $Q_{720}$. Depending on the time constant of the preceding delay segment $S_1$ and the duration of the low state, the voltage at input $512_2$ may transition to a low state at some time after input signal 155 transitions from a high state to a low state. This turns $Q_{702}$ off and allows $C_{704}$ to be discharged by current from $I_{708}$. If the duration of the low state is still sufficient, the voltage at output $514_2$ drops below the reference voltage set by $V_{740}$ and causes output $526_2$ to transition to a high state and the output $528_2$ to transition to a low state. The low state at output $528_2$ activates the delay element $510_3$ in subsequent delay segment $S_3$.

The response time following detection of a threshold may be improved by a positive feedback from output $526_2$ to slightly vary $V_{740}$. The time delay $\tau_2$ associated with delay segment $S_2$ is governed by the charge conservation at output $514_2$. The value of time delay $\tau_2$ may be determined by the difference between the preset voltage across $C_{704}$, $V_{PRSET}$, the value $V_{740}{}^{th}$ of reference voltage $V_{740}$ when control 742 is at a low state, differential amplifier offset voltage $V_{OS}{}^{th}$ at the switching threshold, the value of capacitor $C_{704}$, stray capacitance $C_S$ associated with output $514_2$, current $I_{708}$, base current $I_b$ of $Q_{720}$, and the charge $Q_2(I_{708})$ stored in the emitter of $Q_{702}$. This relationship may be represented as follows:

$$(I_{708}+I_b)\tau_2=(V_{PRESET}-V_{740}{}^{th}-V_{OS}{}^{th})(C_{704}+C_S)-Q_e(I_{708}) \quad (10)$$

The resolution of the discrete rate detector depends on the selection of time delays $\tau_1$–$\tau_N$, which may be programmed, for example, through the value of current $I_{708}$ for each corresponding delay segment $S_1$–$S_N$.

Continuous Forward Rate Detector

Figure 8:
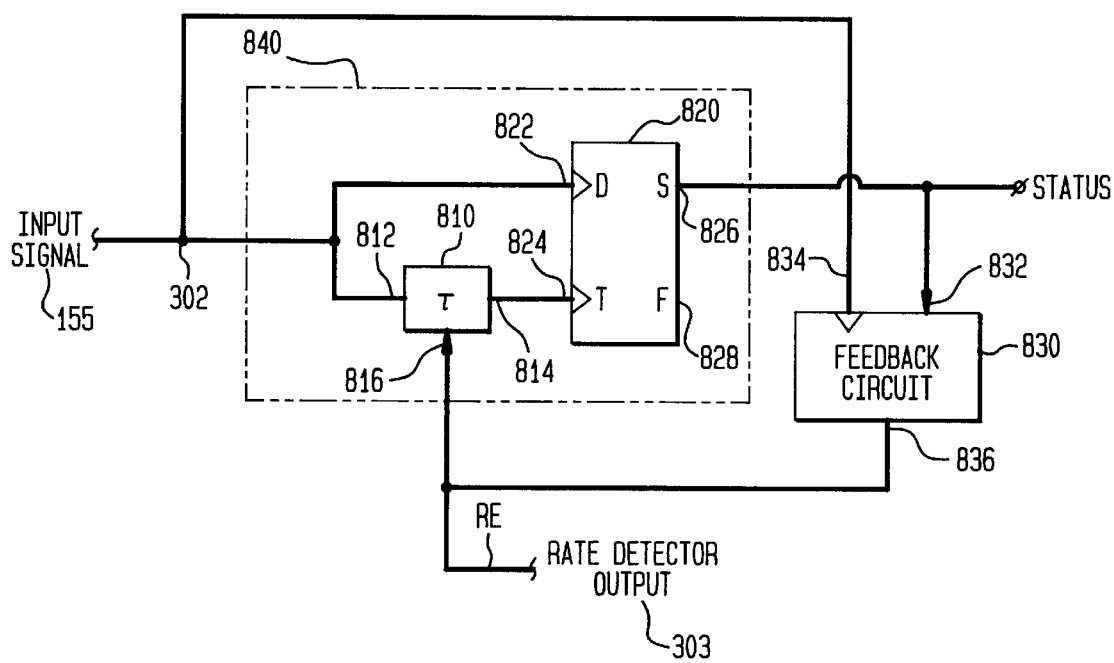
FIG. 8 is a block diagram of a forward rate detector, which performs continuous pulse-width auto-correlation, in accordance with an embodiment of the invention.

FIG. 8 is a block diagram of forward rate detector 301, which performs continuous pulse-width auto-correlation, in accordance with an embodiment of the invention. As shown, forward rate detector 301 comprises minimum interval correlator 840, feedback circuit 830, and output 303. Output 303, whose value is rate estimate signal RE, receives output 836 of feedback circuit 830.

Minimum interval correlator 840 includes a tunable (or programmable) edge-triggered time interval generator 810 and an edge transition comparator 820.

Time interval generator 810 receives at inputs 812 and 816 input signal 155 and output 836 of feedback circuit 830, respectively. In response to a transition in input signal 155, time interval generator 810 generates at output 814 a corresponding transition delayed by time $\tau$, which is controlled by rate estimate signal RE. Alternatively, in response to a transition in input signal 155, time interval generator 810 may generate at output 814 a corresponding set of transitions delayed by a set of times $\tau$, which may have different values and are controlled by rate estimate signal RE.

The value of $\tau$ is related to rate estimate signal RE through a known relationship $\tau=\tau(RE)$. Time interval generator 810 may, for example, be implemented such that the product of rate estimate signal RE and $\tau(RE)$ is nearly constant to a first order.

Edge transition comparator 820 receives at inputs 822 and 824 input signal 155 and output 814 of interval generator 810, respectively. Output 826 of edge transition comparator 820 generates a signal, which is monotonically related to the difference between $\tau$ and $\tau_{bit}$. Edge transition comparator 820 generates at output 826 a positive pulse when a subsequent transition in input signal 155 occurs before $\tau$ time has elapsed. Output 826 is received by input 832 of feedback circuit 830, which outputs rate estimate signal RE at output 836 to adjust $\tau$, such that a prescribed rate of pulses are generated at output 826. The time constants within the feedback circuit 830 may be controlled via input 834 by the rate of transitions in input signal 155. The prescribed rate of pulses from output 826 may have a constant duty cycle. Alternatively, the prescribed rate may depend on the rate of transitions in input signal 155.

In one embodiment, the relationship between the rate estimate signal RE and $1/\tau$ may, for example, be linear. Output 836 of feedback circuit 830 controls $\tau$ via negative feedback to input 816 of interval generator 810. The negative feedback sets rate estimate signal RE such that $\tau(RE)$ equals $\tau_{bit}$. Hence, bit rate frequency $f_{bit}$ of input signal 155 may be determined based on rate estimate signal RE since bit rate frequency $f_{bit}$ is nearly proportional to rate estimate signal RE. In addition, to reduce noise in rate estimate signal RE, forward rate detector 301 may also include, for example, an analog or digital means in feedback circuit 830 or rate selector 310 for filtering noise in rate estimate signal RE.

In accordance with another embodiment of the invention, forward rate detector 301 may estimate $\tau_{bit}$ using a pulse width auto-correlation method. FIGS. 9a–d illustrate the timing diagrams of input signal 155, output 814 of time interval generator 810, output 826 of edge transition comparator 820, in accordance with this embodiment. FIG. 9e illustrates the distribution of values at output 826 for different values of $\tau$ and an arbitrary fixed value of $\tau_{bit}$.

Figure 9A:
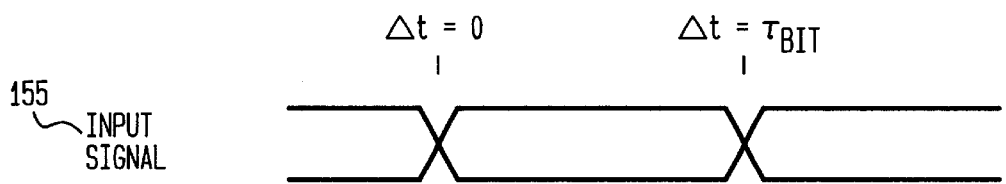
FIGS. 9a, 9b, 9c, 9d, and 9e illustrate the timing diagrams of an input signal, output of a time interval generator, and output of an edge transition comparator, in accordance with an embodiment of the invention.

FIG. 9a shows input signal 155 with a transition occurring at time $\Delta t=0$ and a subsequent transition at $\Delta t=\tau_{bit}$. The transition at $\Delta t=0$ triggers time interval generator 810, whose output pulse is delayed by $\tau$. Three values of $\tau$ are indicated by fast F, slow S, and aligned A.

Figure 9B:
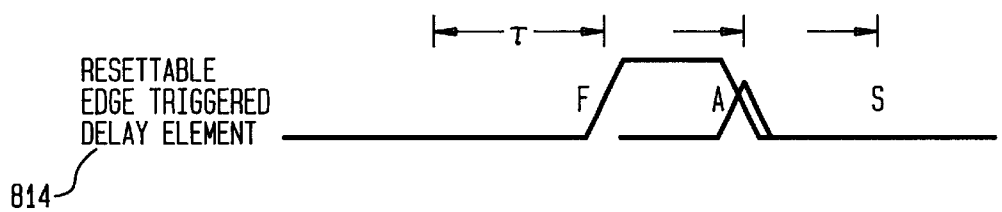
Figure 9C:
Figure 9D:
Figure 9E:
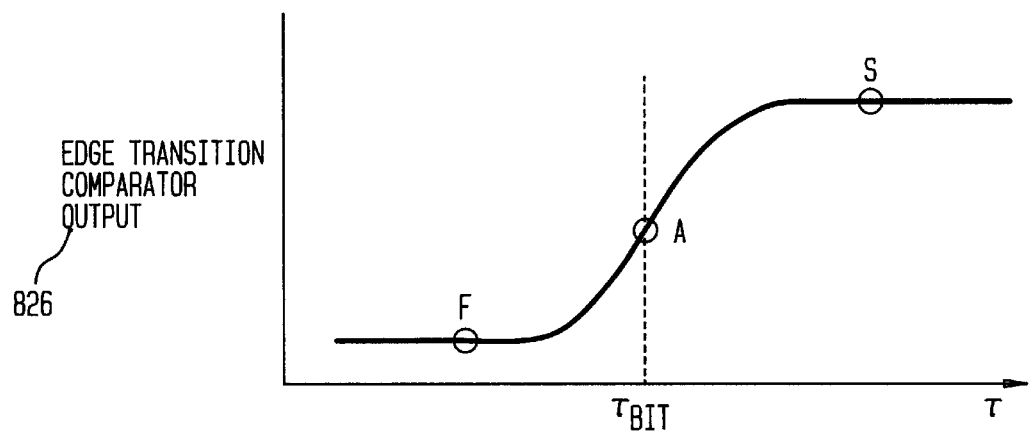

FIGS. 9b and 9c illustrate state of output 814 of time interval generator 810 for two different embodiments. FIG. 9d illustrates state of output 826 of edge transition comparator 820 for the two embodiments.

In the first embodiment, time interval generator 810 includes one or more resettable edge triggered delay elements, for example delay elements $510_1$–$510_N$ shown in FIG. 5. As shown in FIG. 9b, in this embodiment, time interval generator 810 generates at output 814 a pulse, which starts after $\tau$ time has elapsed and is reset by the next transition in input signal 155.

In the second embodiment, time interval generator includes an edge triggered one-shot, which is described below in detail. As shown in FIG. 9c, in this embodiment, time interval generator 810 generates at output 814 a single pulse starting at time $\Delta t=0$, which has duration $\tau$.

In both embodiments, if time $\tau$ is set shorter than $\tau_{bit}$, as indicated by F, the next transition in input signal 155 occurs at $\Delta t=\tau_{bit}$ after $\tau$ time has elapsed, and output 826 is set to a low state. If time $\tau$ is set to a longer duration than $\tau_{bit}$, as indicated by S, a subsequent transition in input signal 155 at $\Delta t=\tau_{bit}$, occurs before $\tau$ time has elapsed, and output 826 is set to a high state.

There is perfect alignment between the pulse generated at output 814 of time interval generator 810 and input signal 155 when $\tau=\tau_{bit}$, as indicated by A, and a transition in input signal 155 that occurs at $\tau_{bit}$ overlaps with $\tau$. Output 826 may be in a high or a low state when there is perfect alignment. Transitions in input signal 155 that occur long after time $\tau$ may be ignored since they may represent a run of bits with $\Delta t=n\tau_{bit}$ and $n \geq 2$.

FIG. 9e illustrates the distribution of values assumed by output 826 for different values of $\tau$ and a given value of $\tau_{bit}$. This distribution represents the transfer function of minium interval correlator 840, which includes time interval generator 810 and edge transition detector 820. Based on statistical interpretation of relative frequency, the graph in FIG. 9e also illustrates the mean value at output 826 that would be observed after many instances of transitions of input signal 155. The graph in FIG. 9e has a steep slope at $\tau=\tau_{bit}$, which distinguishes between conditions F and S. The shape of the transition between F and S may be determined by, for example, the distribution P(n) of run lengths n.

Edge transition comparator 820 compares the interval between the trailing edge of input signal 155 and output 814 of time interval generator 810, and via feedback circuit 830, adjusts $\tau$ to the value $\tau_{bit}=1/f_{bit}$. After the settling time of feedback circuit 830, the adjusted $\tau$ represents an estimate of $\tau_{bit}$. Hence, in this embodiment, harmonic locking does not occur because the estimated bit is uniquely related to $f_{bit}$.

Minimum Interval Correlator

Figure 10:
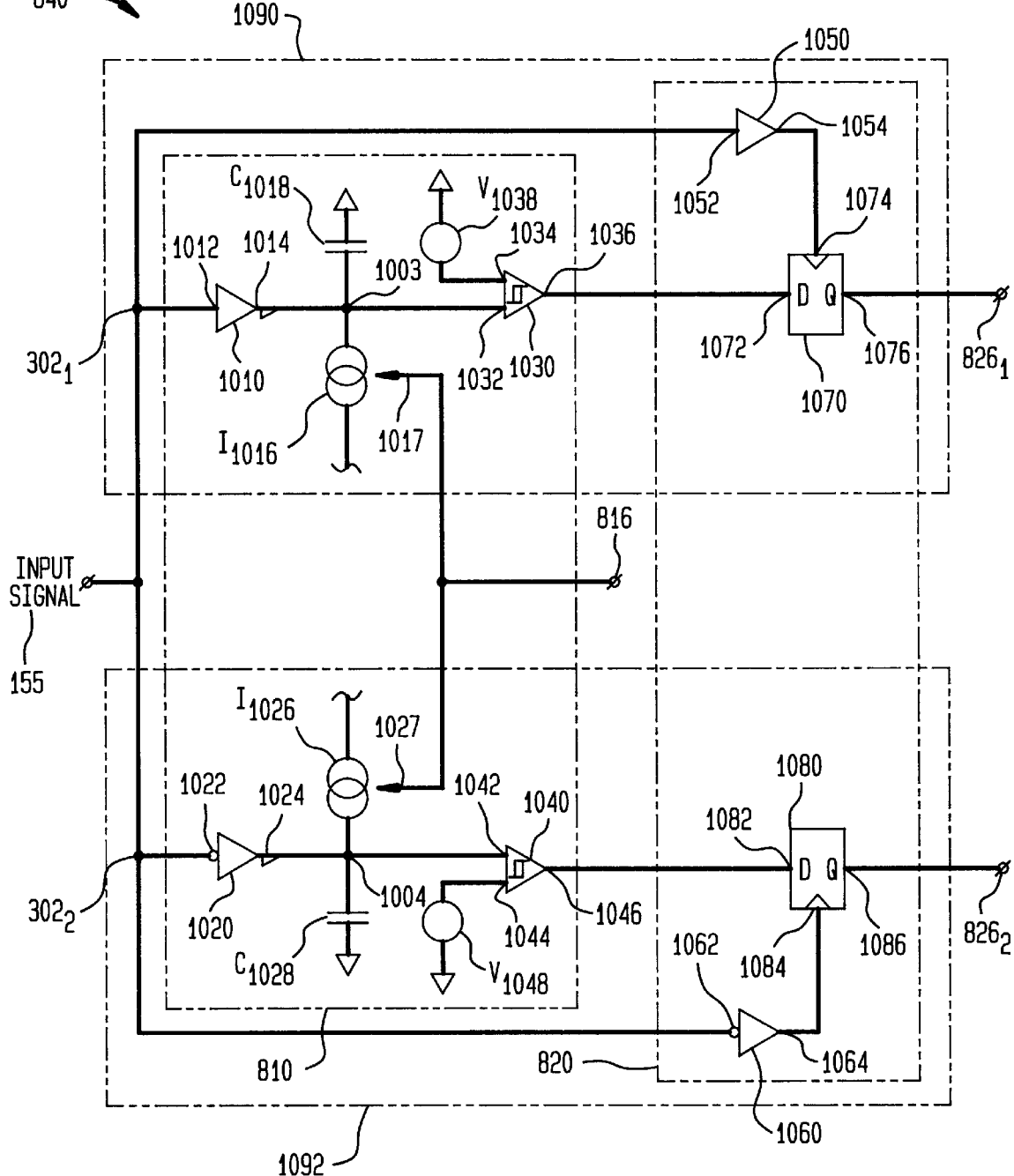
FIG. 10 is a circuit diagram of a minimum interval correlator, in accordance with an embodiment of the invention.

FIG. 10 shows a circuit diagram of minimum interval correlator 840 (shown in FIG. 8), in accordance with an embodiment of the invention. In this embodiment, the response to falling edge transitions and rising edge transitions in input signal 155 are effectuated through two separate paths. Minimum interval correlator 840 is partitioned into a falling edge triggered minimum interval correlator 1090 and a rising edge triggered minimum interval correlator 1092. Minimum interval correlators 1090 and 1092 each perform the functions of time interval generator 810 and transition comparator 820 shown in FIG. 8.

Minimum interval correlators 1090 and 1092 include outputs $826_1$ and $826_2$, which collectively form output 826 of minimum interval correlator 840. Although minimum interval correlators 1090 and 1092 include separate outputs $826_1$ and $826_2$, their respective inputs $302_1$ and $302_2$ connect to input signal 155.

Minimum interval correlator 1090 includes non-inverting buffer 1010, capacitor $C_{1018}$, programmable current source $I_{1016}$, comparator 1030, voltage reference $V_{1038}$, non-inverting buffer 1050, and positive edge triggered D-type flip-flop 1070. Minimum interval correlator 1092 includes inverting buffer 1020, capacitor $C_{1028}$, programmable current source $I_{1026}$, comparator 1040, voltage reference $V_{1048}$, inverting buffer 1060, and positive-edge triggered D-type flip-flop 1080.

Input 302, which includes nodes $302_1$ and $302_2$, receives input signal 155. Node $302_1$ connects to non-inverting inputs 1012 and 1052 of buffers 1010 and 1050, respectively, in minimum interval correlator 1090. Output 1014 of buffer 1010 connects via node 1003 to capacitor $C_{1018}$, programmable current source $I_{1016}$, and input 1032 of comparator 1030. Reference input 1034 of comparator 1030 connects to voltage reference $V_{1038}$. Output 1036 of comparator 1030 connects to D input 1072 of D-type flip-flop 1070, whose clock input 1074 is driven by output 1054 of buffer 1050.

Node $302_2$ connects to inverting inputs 1022 and 1062 of buffers 1020 and 1060, respectively, in minimum interval correlator 1092. Output 1024 of buffer 1020 connects via node 1004 to capacitor $C_{1028}$, programmable current source $I_{1026}$, and input 1042 of comparator 1040. Reference input 1044 of comparator 1040 connects to voltage reference $V_{1048}$. Output 1046 of comparator 1040 connects to D input 1082 of D-type flip-flop 1080, whose clock input 1084 is driven by output 1064 of buffer 1060. Outputs 1076 and 1086 of D-type flip-flops 1070 and 1080 form output $826_1$ and $826_2$, respectively. Programming inputs 1017 and 1027 control via input 816 current sources $I_{1016}$ and $I_{1026}$, respectively.

The operations of minimum interval correlators 1090 and 1092 are similar except that all processing is active on opposite transitions in input signal 155. The operation of minimum interval correlator 1090 is as follows: Output port 1014 assumes a low impedance state with a preset output level of $V_{PRESET}$ when input 1012 is at a high state, and assumes a high impedance state when input 1012 is at a low state. For example, $V_{PRESET}$ may be more positive than reference voltage $V_{1038}$. A high state in input signal 155 causes buffer 1010 to charge capacitor $C_{1018}$ to $V_{PRESET}$.

When the input signal 155 undergoes a transition from a high to a low state, current flow from output 1014 of buffer 1010 is inhibited, and capacitor $C_{1018}$ is freely discharged by programmable current from $I_{1016}$. If the duration of the low state in input signal 155 is sufficiently long, the voltage at node 1003 drops below the level set by $V_{1038}$, and output 1036 of comparator 1030 transitions to a low state. D-type flip-flop 1070 captures via the rising edge transition at the output 1054 of buffer 1050 the state of output 1036 at time $\Delta t = n\tau_{bit}$, when input signal 155 undergoes a subsequent low to high transition.

The time required for capacitor $C_{1018}$ to discharge from $V_{PRESET}$ to $V_{1048}$ is $\tau(I_{1016})$. Output $826_1$ may be at a low state if $\Delta t > \tau(I_{1016})$, and may be at a high state if $\Delta t < \tau(I_{1016})$. Output $826_1$ may always be low when $\tau < \tau_{bit}$. If $\tau > \tau_{bit}$, there may be small values of run-length n for which output $826_1$ may be at a high state. Output $826_1$ may, however, be at a low Mate for large n.

FIG. 9e shows the distribution of values of output $826_1$ averaged over typical values of run-length n. The time constant $\tau(I_{1016})$ may be represented as follows:

$$(I_{1016}+I_b)\tau=(V_{PRESET}-V_{1038}-V_{OS}^{th})(C_{1018}+C_S)-Q_{O-1014}(I_{1016}), (11)$$

where $V_{OS}^{th}$ is the offset voltage at a threshold of comparator 1030, $C_S$ is the stray capacitance associated with node 1003, $I_b$ is the input bias current of comparator 1030, and $Q_{O-1014}(I_{1016})$ is the charge removed by output 1014 when buffer 1010 is turned off.

Similar operation occurs in minimum interval corrolator 1092 for rising edge transitions in input signal 155. Outputs $826_1$ and $826_2$ indicate whether $\tau$ is greater or less than $\tau_{bit}$. In accordance with one embodiment, outputs $826_1$ and $826_2$ may be used to control $\tau$ through $I_{1016}$ and $I_{1026}$ using negative feedback. Rate estimate signal RE may be determined from the value of control signal 816 necessary to achieve $\tau = \tau_{bit}$.

Minimum interval correlator 1090 of FIG. 10 constitutes one embodiment of a unipolar minimum interval correlator, which is active on the falling edge of input signal 155. Unipolar minimum interval correlator 1090 may include a programmable gated delay, which includes buffer 1010, capacitor $C_{1018}$, current source $I_{1017}$, comparator 1013, and D-type flip-flop 1070. D-type flip-flop 1070 may include two latches (not shown), which are controlled by node $302_1$ via clock input 1074. In one embodiment, one of the latches in 1070 may be shared with the programmable gated delay to create a falling edge triggered non-retriggerable one-shot. By performing several latching and comparison operations in parallel, higher operating speeds may be achieved in this embodiment.

Figure 11:
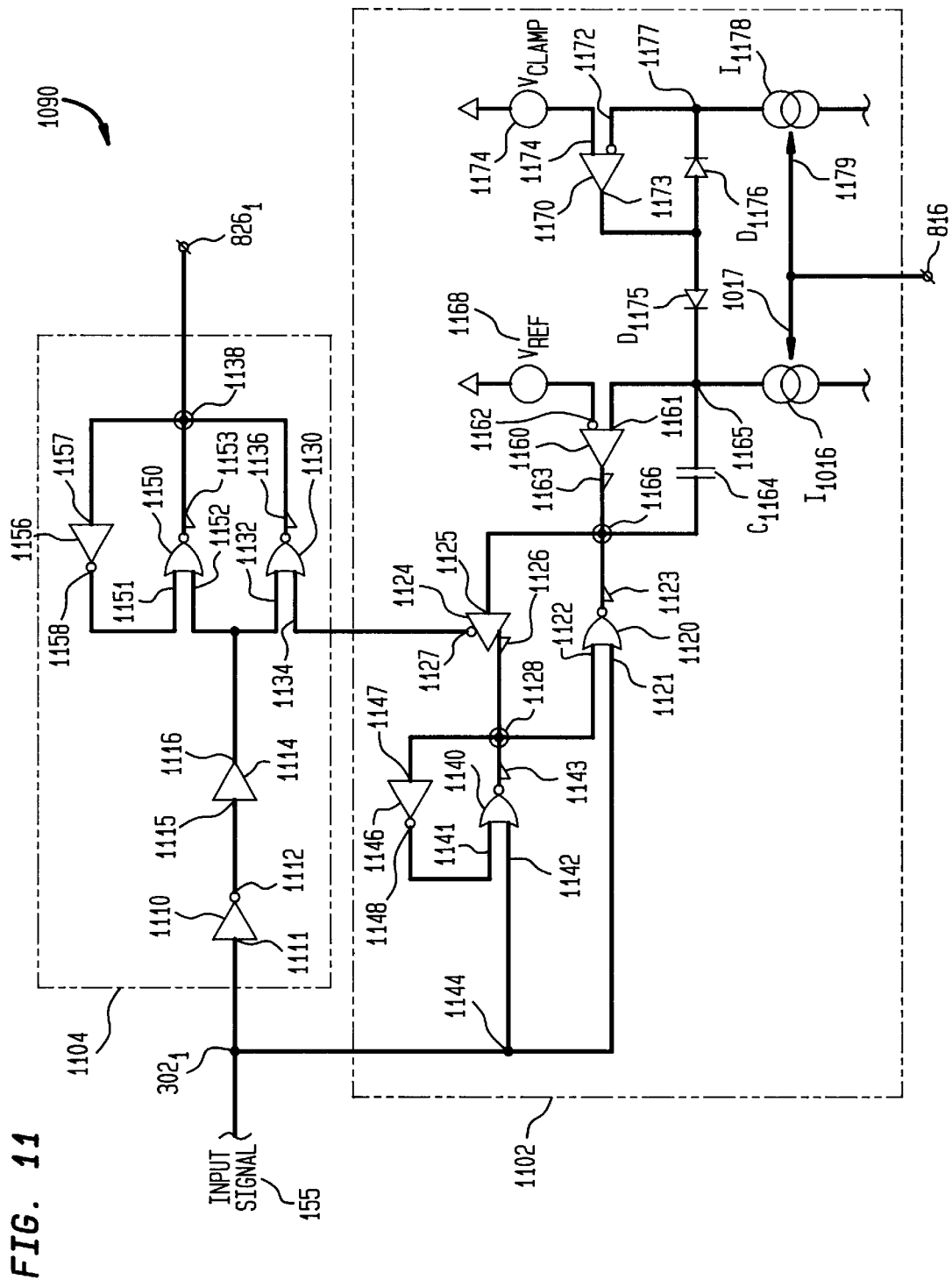
FIG. 11 illustrates an emitter coupled logic (ECL) implementation of a unipolar minimum interval correlator, in accordance with an embodiment of the invention.

FIG. 11 illustrates an emitter coupled logic (ECL) implementation of unipolar minimum interval correlator 1090, in accordance with an embodiment of the invention. Unipolar minimum interval correlator 1090 comprises edge transition comparator 1104 and falling-edge triggered non-retriggerable one-shot 1102. Edge transition comparator 1104 includes invertors 1110 and 1156, non-inverting buffer 1114, NOR gates 1130 and 1150, and node 1138. Node 1138 performs a wired-OR operation.

Falling edge triggered non-retriggerable one-shot 1102 includes comparator 1160, timing capacitor $C_{1164}$, programmable current sources $I_{1016}$ and $I_{1179}$, diodes $D_{1175}$ and $D_{1176}$, reference voltages $V_{REF}$ and $V_{CLAMP}$, operational amplifier 1170, NOR gates 1120 and 1140, inverter 1146, buffer 1124, and nodes 1128 and 1166. Nodes 1128 and 1166 each perform a wired-OR operation.

Input 1111 of inverter 1110 and node 1144 of one-shot 1102 receive input signal 155. The falling edge of input signal 155 triggers one-shot 1102 to generate an output pulse of duration $\tau(I_{1016})$ at output 1127 of buffer 1124. Duration $\tau$ is directly controlled by controlled current source $I_{1016}$ or indirectly by input 816 via control input 1017 to $I_{1016}$. Output 1127 of buffer 1124 is at a high state in the reset state, and transitions to a low state during time $\tau$. One-shot 1102 cannot be retriggered by a subsequent change in the state of input signal 155 until after both time $\tau$ has elapsed and input signal 155 returns to a high state.

Input node 1144 connects to input 1142 of NOR gate 1143 and input 1121 of NOR gate 1120. The open emitter output 1143 of NOR gate 1140 connects via node 1128 to input 1122 of NOR gate 1120, input 1147 of inverter 1146, and non-inverting open emitter output 1126 of buffer 1124. Output 1148 of inverter 1146 connects to input 1141 of NOR gate 1140 to create an R-S latch.

A high state at node 1144 sets node 1128 to a low state when output 1126 is low, while a high state at output 1126 overrides input 1144 to set node 1128 to a high state. Output 1126 of buffer 1124 may be at a high state during time $\tau$, and may inhibit NOR gate 1120 from responding to changes in input signal 155. Open emitter output 1123 of NOR gate 1120 connects via node 1166 to the open emitter output of comparator 1160, capacitor $C_{1164}$, and input 1125 of buffer 1124.

Capacitor $C_{1164}$ connects to non-inverting input 1161 of comparator 1160, the cathode of diode $D_{1175}$, and programmable current source $I_{1016}$. Output 1173 of opamp 1170 drives the anode of diode $D_{1175}$. Opamp 1170 may be configured, for example, as a voltage follower with diode $D_{1176}$ in the feedback loop between output 1173 and inverting input 1172.

Diode $D_{1176}$ may be biased at the same current density as $D_{1175}$ by programmable current source $I_{1178}$. Node 1179 controls current $I_{1178}$ and node 1017 controls current $I_{1017}$. Both control node 1017 and control node 1179 connect to input 816. Inverting input 1162 of comparator 1160 connects to voltage source $V_{REF}$. Non-inverting input 1174 of opamp 1170 connects to voltage source $V_{CLAMP}$. Inverting output 1127 of buffer 1124, which is controlled by node 1166, forms the output of one-shot 1102, and connects to input 1134 of gate 1130 in edge transition comparator 1104.

In the quiescent state, the input signal 155 and input node 1144 may be in the high state, nodes 1128 and 1166 may be in the low state, and the voltage at node 1165 may be held at $V_{CLAMP}$. When the input node 1144 transitions to a low state due to a negative transition in input signal 155, output 1123 of NOR gate 1120 transitions to a high state. The coupling through capacitor $C_{1164}$ forces node 1165 to a high state. A positive feedback through comparator 1160 and $C_{1165}$ holds node 1166 at a high state until the voltage at node 1165 decreases to $V_{REF}$.

When node 1166 transitions to a high state after input signal 155 transitions to a low state, buffer 1124 drives node 1128 to a high state, activating a first latch, which includes inverter 1146 and NOR gate 1140. Output 1123 of NOR gate 1120 may be subsequently inhibited when node 1128 transitions to a high state. The first latch continues to hold node 1128 at a high state, and inhibits output 1123, which may only be reset after node 1166 transitions to a low state at time τ. The first latch is reset to a low state through NOR gate 1140 when both node 1166 returns to a low state and input signal 155 transitions to a high state, restoring one-shot 1102 to the quiescent state. The voltage on capacitor $C_{1112}$ has sufficient time to reach steady state since one-shot 1102 triggers only on the falling edge transitions.

The pulse duration τ may be related to the capacitor discharge current $I_c$ by conservation of charge at node 1185. This relationship may be represented as follows:

$$(I_{1016}+I_b)\tau=[\Delta V_{1166}(I_{1016};\tau)+V_{CLAMP}-V_{REF}-V_{OS}{}^{th}]C_{1164}+(V_{CLAMP}-V_{REF}-V_{OS}{}^{th})C_S+\Delta Q_B{}^{th}-Q_d(I_{1016}), \quad (12)$$

where $C_S$ is the stray capacitance associated with node 1165 and $Q_d$ is the charge stored in diode $D_{1175}$. $\Delta V_{1166}$ represents the rising voltage waveform at 1166 after the falling transition in input signal 155 triggers one-shot 1102.

In accordance with an embodiment of the invention, the parameters associated with comparator 1160 are as follows: $I_b$ is the input bias current, $V_{OS}{}^{th}$ is the input offset at threshold and $\Delta Q_B{}^{th}$ is the input charge required to switch comparator 1160. This expression shows that $I_{1016}$ may be nearly proportional to $f_{bit}$ when $\tau=\tau_{bit}$.

Non-inverting buffer 1114 receives output 1112 of the inverter 1110, which matches the turn-on delay of one-shot 1102. NOR gate 1130 compares outputs 1116 and 1127 of buffer 1114 and one-shot 1102, respectively. Open emitter output 1136 of NOR gate 1130 may be a current pulse, which may, for example, be a function of the time interval between the subsequent rising edge in input signal 155 and the rising edge of output 1127 of one-shot 1102 after delay time τ.

Node 1138 transitions to a high state when input signal 155 transitions to a high state while output 1127 of one-shot 1102 is at a low state. NOR gate 1150 and inverter 1156 connect to each other to form a second latch, which is activated by a high state at node 1138. If node 1138 is raised sufficiently high, then feedback loop around gate 1150 and inverter 1156 holds node 1138 at a high state until input signal 155 transitions to a low state and output 1116 of gate 1114, which connects to NOR gate 1150, transitions to a high state.

The relationship between the current pulse from output 1136 of gate 1130 and $\tau-\tau_{bit}$ may be represented as follows: Charge $Q_{O\_1136}$ in the current pulse from gate 1130 is proportional to $\tau-\tau_{bit}-\epsilon\tau_{gate}$, where $\epsilon\tau_{gate}$ is a fixed fraction of the nominal gate response-time. The probability that node 1138 may be set to a high state depends on $Q_{O\_1136}$ through a function $F_{gate}(Q_{O\_1136})$ whose characteristics are shown in FIG. 9e. The average time that node 1138 remains at a high state, once activated, may approximately be $\bar{n}_1\tau_{min}+\tau_{min}-\epsilon\tau_{gate}$. The signal at node 1138 may be used to control τ through $I_{1016}$ by using a negative feedback.

Analog Feedback Circuit

Figure 12A:
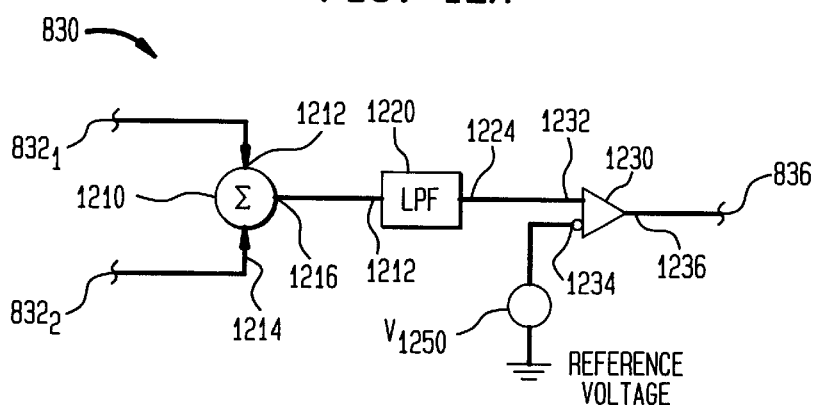
FIGS. 12a, 12b, 12c, and 12d illustrate an analog implementation of a feedback circuit and associated signals in a forward rate detector, in accordance with an embodiment of the invention.
Figure 12B:
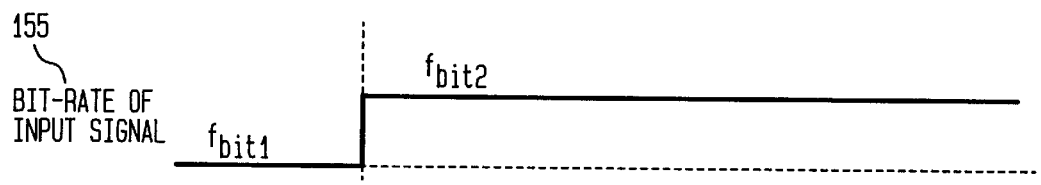
Figure 12C:
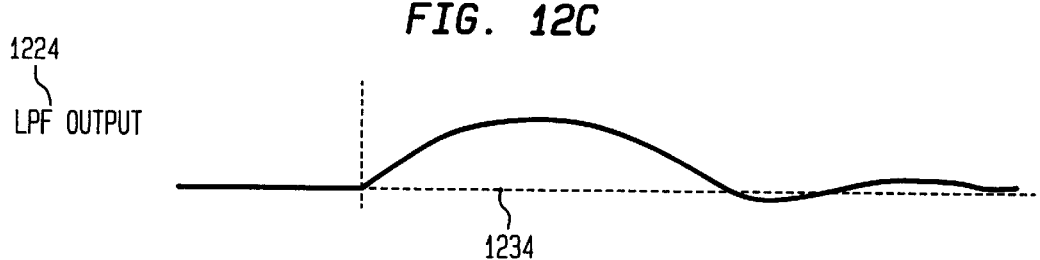
Figure 12D:
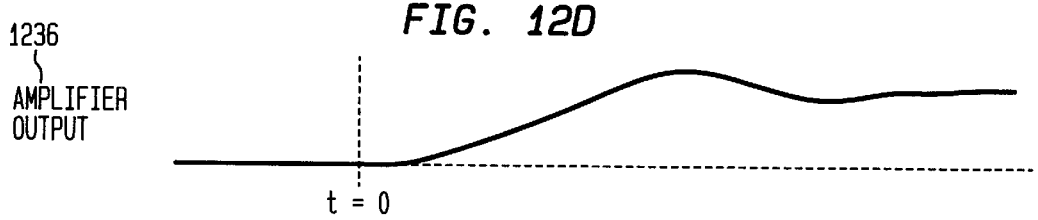

FIG. 12a illustrates an analog implementation of feedback circuit 830, in accordance with an embodiment of the invention. In this embodiment, feedback circuit 830 comprises a summation circuit 1210, a low pass filter 1220, a differential amplifier 1230, and a reference voltage $V_{1250}$. Low pass filter 1220 includes an output 1224, and differential amplifier 1230 includes an output 1236. FIGS. 12b–d illustrate a change in bit rate of input signal 155, change in low-pass filter output 1224, and change in amplifier output 1236.

Feedback circuit 830 receives at nodes 832$_1$ and 832$_2$, which collectively form input 832, outputs 826$_1$ and 826$_2$, respectively, of minimum interval correlator 840. Node 832$_1$ connects to input 1212 of summation circuit 1210, and Node 832$_2$ connect to summation circuit input 1214. Low pass filter 1220 filters output 1216 of summation circuit 1210, which is applied to non-inverting input 1232 of differential amplifier 1230. Reference voltage $V_{1250}$ connects to inverting input 1234 of differential amplifier 1230. Output 1236 of amplifier 1230 forms feedback circuit output 836.

Inputs 1212 and 1214 of summation 1210 receive nodes 832$_1$ and 832$_2$ pulses from outputs 826$_1$ and 826$_2$ of unipolar minimum interval correlators 1090 and 1092, respectively, when $\tau_{bit}<\tau$. Low pass filter 1220 removes high frequency variations from the combined signal at output 1216 of summation 1210. Differential amplifier 1230 amplifies the difference between the filtered signal at output 1224 of filter 1220 and reference voltage $V_{1250}$. The amplified difference between $V_{1224}$ and $V_{1250}$ appears at output 1236, and may be used to control the period τ of time interval generator 810. Differential amplifier 1230 may incorporate phase margin compensation, which may be necessary to maintain overall feedback loop dynamic stability.

FIG. 12b illustrates an increase in bit rate $f_{bit}$ of input signal 155 from $f_{bit1}$ to $f_{bit2}>f_{bit1}$ occurring at time t=0. The change in the bit rate is detected by minimum interval correlator 840, which generates a change in the rate of pulses that appear at inputs 1212 and 1214 of summation 1210 and consequently at output 1216. The level at output 1224 for t<0 may be maintained by a constant rate of pulses from minimum interval correlator 840. The horizontal dashed line in FIG. 12c illustrates that prior to the change at t=0, a negative feedback holds output 1224 at nearly $V_{1250}$. A change in the rate of pulses at t>0 at output 1216 generates a transient change in output 1224. The amplified signal appearing at output 1236 changes until period τ of time interval generator 810 settles to a new value of $1/f_{bit2}$.

Minimum interval correlator 840 may generate an output pulse when isolated "ones" and "zeroes" occur in input signal 155. Input 1212, which is connected to falling edge transition comparator output 826$_1$ via node 832$_1$ may be active following high-to-low transitions in input signal 155. The probability that output 826$_1$ transitions to a high state following an isolated "zero" may be represented by $F(\tau-\tau_{bit})$, as shown in FIG. 9e.

Let $P_0(n)$ and $P_1(n)$ denote the distribution of run lengths n for consecutive "zeroes" and "ones," respectively, in input signal 155. The probability that an isolated "zero" occurs following a high-to-low transition is therefore $P_0(n=1)$. The occurrence rate of isolated "zeroes" may be represented as follows:

$$\text{rate of isolated 0} = \frac{P_0(1)}{(\bar{n}_0+\bar{n}_1)\tau_{bit}},$$

where $\bar{n}_0$ and $\bar{n}_1$ represent the average length for a run of "zeroes" and "ones," respectively. The average time interval that output 826$_1$ remains at a high state prior to a subsequent high-to-low transition can be represented as follows:

$$\text{persistence time} \approx (\bar{n}_1+\zeta\bar{n}_0)\tau_{bit},$$

The holding property of the edge transition detector 820 may be represented by parameter ζ. In an embodiment where minimum interval correlator 1090 includes D-type flip-flop 1070, ζ may equal 1. Alternatively, in an embodiment where minimum interval correlator 1090 includes falling edge triggered non-retriggerable one-shot 1102, ζ may equal 0. If the durations of consecutive runs are independent, the average value of input 1212 may be represented as follows:

$\overline{V}_{1212}$ (rate of isolated 0)×$F(\tau-\tau_{bit})$×(persistence time) (13)

An analogous expression to equation 13 applies to input 1214 of rising edge transition comparator output 826$_2$. The filtered output 1224 may be represented as follows:

$$\overline{V}_{1224} \propto \frac{(\overline{n}_0 + \zeta\overline{n}_1)P_1(1) + (\overline{n}_1 + \zeta\overline{n}_0)P_0(1)}{\overline{n}_0 + \overline{n}_1} F(\tau - \tau_{bit}). \quad (14)$$

In accordance with an embodiment, the average value $\overline{V}_{1224}$ of low-pass filter output 1224 may be used to control τ using a negative feedback. The small-signal gain has the desirable feature that it is independent of $\tau_{bit}$.

Digital Feedback Circuit

Figure 13A:
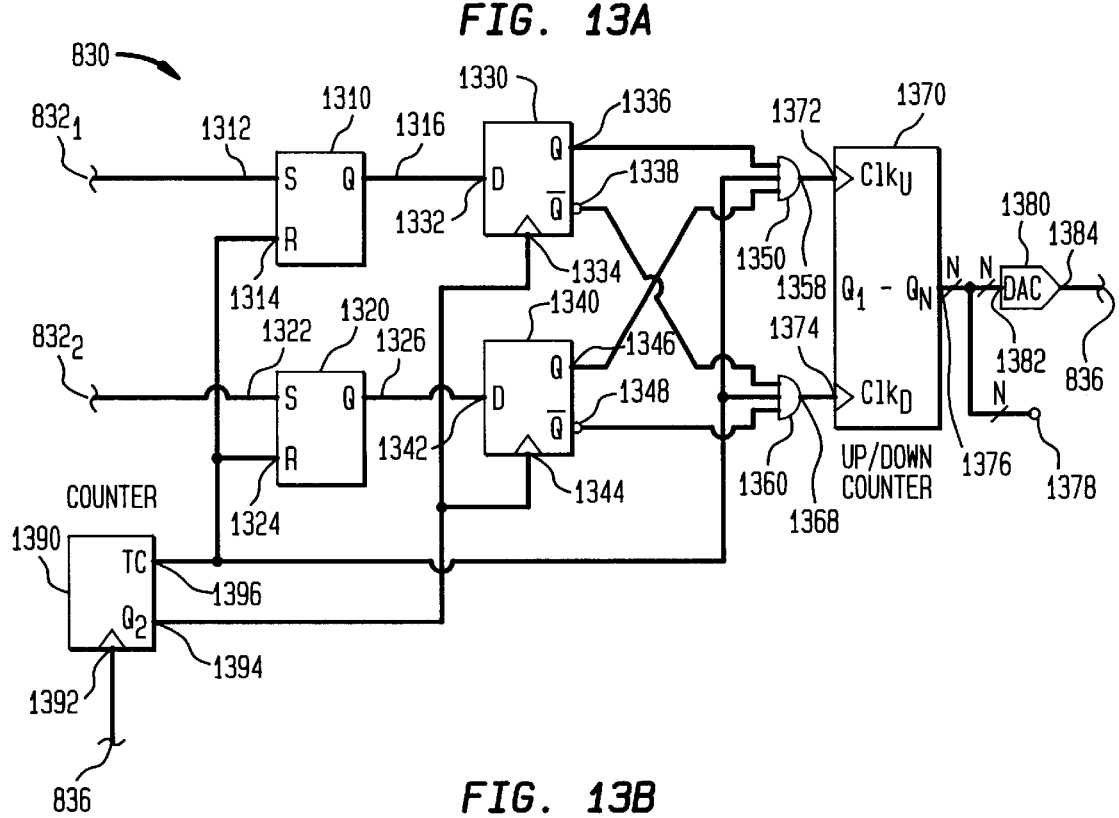
FIGS. 13a, 13b, 13c, 13d, and 13e illustrate a digital implementation of a feedback circuit and associated signals in a forward rate detector, in accordance with an embodiment of the invention.

FIG. 13a illustrates a digital implementation of feedback circuit 830, in accordance with an embodiment of the invention. In this embodiment, feedback circuit 830 comprises R-S latches 1310 and 1320, positive D-type flip-flops 1330 and 1340, AND gates 1350 and 1360, N-stage up/down counter 1370, M-stage binary counter 1390, and digital to analog converter (DAC) 1380. Up/down counter 1370 includes up-count clock (Clk$_U$) input 1372 and down-count clock (Clk$_D$) input 1374. FIGS. 13b–e illustrate changes in bit rate $f_{bit}$ of input signal 155, signal applied to Clk$_U$ input 1372, signal applied to Clk$_D$ input 1374, and analog output 1384 of DAC 1380.

Feedback circuit 830 receives at inputs 832$_1$ and 832$_2$ outputs 826$_1$ and 826$_2$, respectively, of minimum interval correlator 840. Input 834 of feedback circuit 830 receives input signal 155. Node 832$_1$ connects to "set" input 1312 of latch 1310, and node 832$_2$ connects to "set" input 1322 of latch 1320. Latch outputs 1316 and 1326 connect to inputs 1332 and 1342 of D-type flip-flops 1330 and 1340, respectively.

Clock input 1392 of counter 1390 receives input signal 155 via input 834. Terminal count (TC) output 1396 connects to "reset" inputs 1314 and 1324 of latches; 1310 and 1320, respectively. Clock inputs 1334 and 1344 of D-type flip-flops 1330 and 1340 connect to the second stage (Q$_1$) output 1394 of counter 1390.

AND gate 1350 receives inputs from non-inverting outputs 1336 and 1346 of D-type flip-flops 1330 and 1340, respectively, and TC output 1396 of counter 1390. AND gate 1360 receives inputs from inverting outputs 1338 and 1348 of D-type flip-flops 1330 and 1340, respectively, and TC output 1396 of counter 1390. Output 1358 of AND gate 1350 connects to Clk$_U$ input 1372, and output 1368 of AND gate 1360 connects to Clk$_D$ input 1374.

In one embodiment, up/down counter 1370 generates a parallel binary word, which is monotonically related to the difference between the number of pulses applied to Clk$_U$ input 1372 and Clk$_D$ input 1374. In another embodiment, up/down counter 1370 generates a parallel binary signal representing a successive approximation for rate estimate signal RE using a succession of step sizes, which may, for example, vary with the pattern of pulses applied to Clk$_U$ input 1372 and Clk$_D$ input 1374.

"Set" inputs 1312 and 1324 of latches 1310 and 1320 receive pulses from outputs 826$_1$ and 826$_2$, respectively, of unipolar minimum interval correlators 1090 and 1092 when τ>$\tau_{bit}$ is detected by edge transition comparator 820 via nodes 832$_1$ and 832$_2$.

A pulse generated by unipolar minimum interval correlator 1090, which is active on falling edge transitions in input signal 155, sets output 1316 to a high state. Similarly, a pulse generated by unipolar minimum interval correlator 1092, which is active on rising edge transitions in input signal 155, sets output 1326 to a high state.

Counter 1390 counts the number of transitions in input signal 155 modulo $2^M$, where M equals, for example, 4. Second stage (Q$_1$) output 1394 clocks D-type flip-flops 1330 and 1340 on every fourth low-to-high transition in input signal 155, storing the prevailing state of latches 1310 and 1320, respectively.

TC output 1396 transitions to a high state following each $2^M$ low-to-high transitions in input signal 155, and transitions to a low state after the next low-to-high transition in input signal 155. The rising edge of TC output 1396 may be near the center of pulses from Q$_1$ output 1394. A high state on TC output 1396 enables AND gate outputs 1358 and 1368, and resets latches 1310 and 1320 to a low state.

Output 1358 transitions to a high state when TC output 1396 is at a high state if both D-type flip-flop non-inverting outputs 1336 and 1346 are at a high state, advancing the state of up/down counter 1370 forward by one count. Output 1368 transitions to a high state when TC output 1396 is at a high state if both D-type flip-flop inverting outputs 1338 and 1348 are at a high state, decreasing the state of up/down counter 1370 by one count. The state of up/down counter 1370 increases when both unipolar minimum interval correlators 1090 and 1092 detect τ>$\tau_{bit}$, and decreases when neither unipolar minimum interval correlator 1090 and 1092 detect τ>$\tau_{bit}$. The state of up/down counter 1370 holds when only one of unipolar minimum interval correlators 1090 and 1092 detects τ>$\tau_{bit}$. The binary signal at up/down counter output 1376 may be used to control τ using negative feedback.

Feedback circuit 830 may generate a digital signal at output 836 using, for example, output 1376 of up/down counter 1370. Alternatively, feedback circuit 830 may generate an analog signal at output 836 using, for example, output 1384 of DAC 1380, whose input 1382 connects to counter output 1376.

Figure 13B:
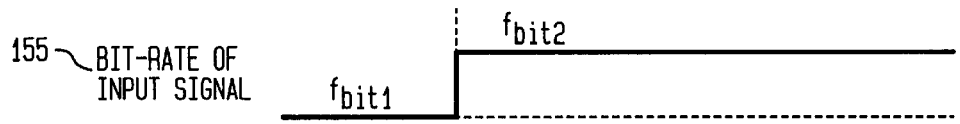
Figure 13C:

FIG. 13b illustrates an increase in bit rate $f_{bit}$ of input signal 155 from $f_{bit1}$ to $f_{bit2}$>$f_{bit1}$ at time t=0. Prior to t=0, negative feedback may hold period τ of interval generator 810 close to 1/$f_{bit1}$. Minimum interval correlator 840 may detect the change in the bit rate, which results in a change in the rate of pulses that appear at both latch inputs 1312 and 1324. The presence of pulses at both latch inputs 1312 and 1324 causes both D-type flip-flop non-inverting outputs 1336 and 1346 to transition to a high state, toggling Clk$_U$ input 1372 as shown in FIGS. 13c.

Figure 13D:
Figure 13E:
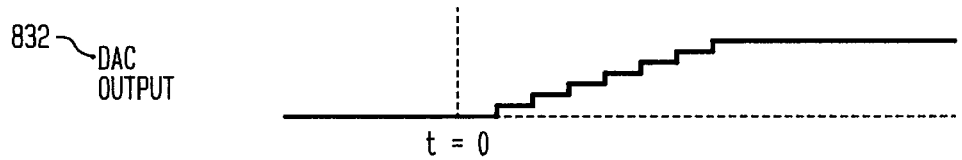

In FIG. 13d, Clk$_D$ input 1374 is not toggled immediately after t=0 since τ>1/$f_{bit2}$. FIG. 13e illustrates analog output 1384 of DAC 1380, which is driven by digital words generated by up/down counter 1370 with, for example, monotonic count states. In up/down counter 1370, upward counting proceeds while τ>1/$f_{bit2}$, and stops when τ=1/$f_{bit2}$.

Rate Selector

Figure 14A:
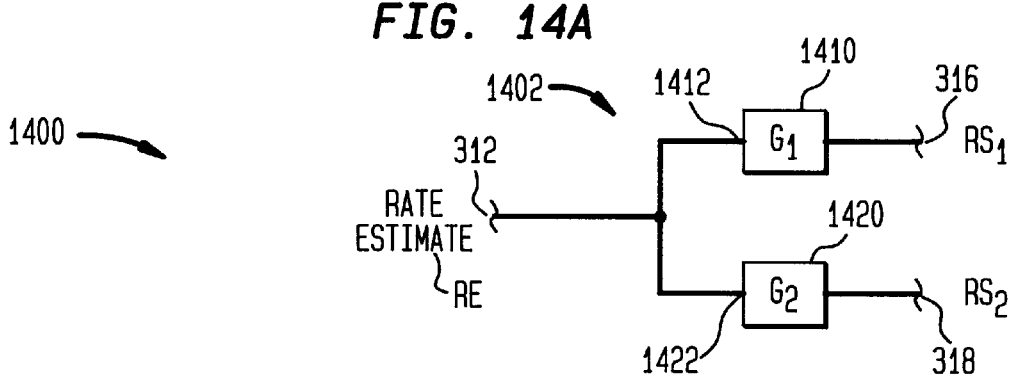
FIGS. 14a and 14b are block diagrams of implementations of a rate selector, in accordance with two embodiments of the invention.
Figure 14B:
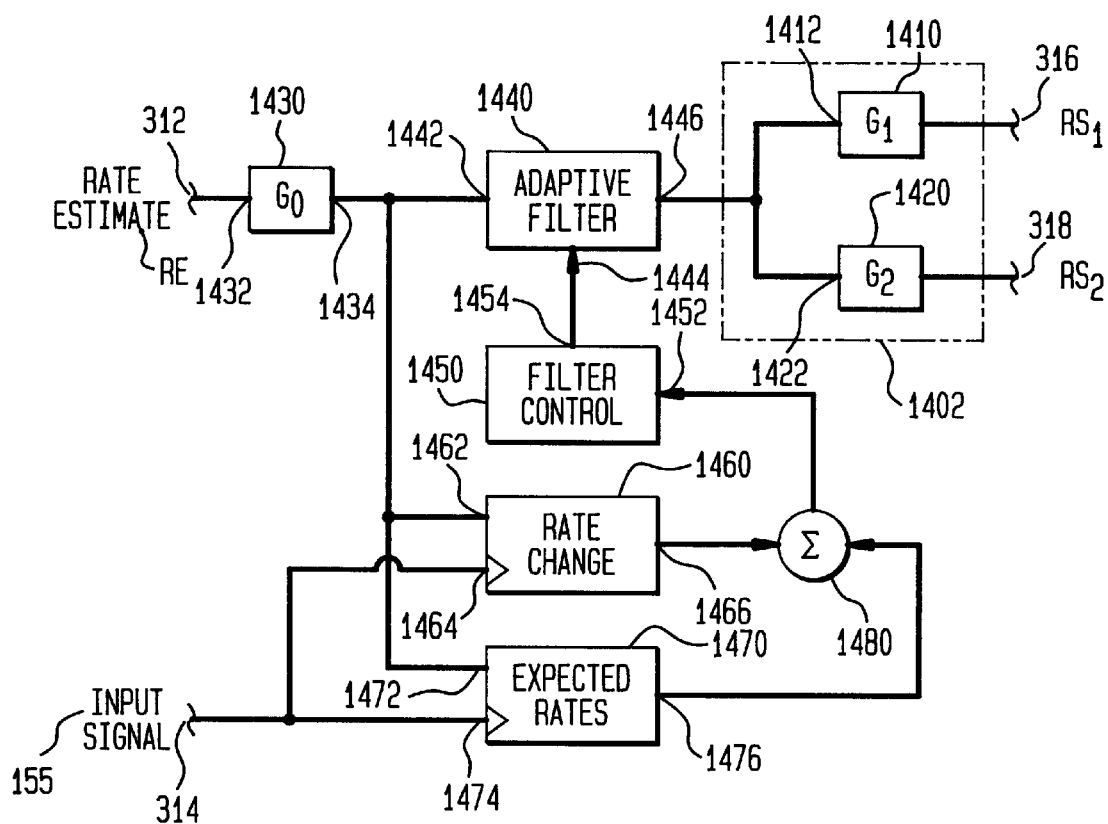

Rate selector 310 tracks changes in the bit rate frequency of input signal 155 while rejecting transient errors in the rate estimate signal RE, which may be caused by jitter and pattern dependent variation in input signal 155. FIGS. 14a–b are block diagrams of implementations of rate selector 310, in accordance with two embodiments of the invention.

In the first embodiment, which is shown in FIG. 14a, rate selector 310 comprises a rate translation 1402, which includes a function block 1410 and a function block 1420.

Rate translation 1402 may receive as input rate estimate signal RE, which is generated by discrete rate detector 301 of FIG. 5. The rate estimate signal RE may also be filtered prior to translation by 1402.

In the second embodiment, which is shown in FIG. 14b, rate selector 310 comprises rate translation 1402 and a rate estimate filter. The rate estimate filter includes a rate correction block 1430, adaptive filter 1440, filter control 1450, rate change detector 1460, expected rate comparator 1470, and summation 1480. Correction block 1430 receives at input 1432 rate estimate signal RE, which may be generated by, for example, continuous rate detector 301 of FIG. 8. Adaptive filter 1440 receives at input 1442 output 1434 of rate correction block 1430. The output of filter 1440 may be applied as an alternative input to rate translation 1402.

Rate translation block 1402 performs a direct one-to-one mapping of an estimated line rate into control signals $RS_1$ and $RS_2$, which appear at output nodes 316 and 318, respectively. Input 1412 of function block 1410 and input 1422 of function block 1420 receive an estimate of the line rate, for example, rate estimate signal RE from discrete rate detector 301 or output from adaptive filter 1430. Function block 1410 generates control signal $RS_1$ at node 316. Function block 1410 may implement, for example, the function implicitly represented by equation (5) or the relationship represented by equation (8).

Function block 1420 generates control signal $RS_2$ at node 318. Function block 1420 may implement, for example, the function implicitly represented by equation (5) or the relationship represented by equation (8).

Several conventional techniques may be used to perform the one-to-one mapping. For example, an analog computer may be used to convert the rate estimate signal RE into control signals $RS_1$ and $RS_2$. Alternately, rate detector 301 or rate selector 310 may be implemented using an A/D converter whose binary outputs select an appropriate entry from a look-up table for control signals $RS_1$ and $RS_2$. The look-up table may include rate specific parameters for $\tau_{ED}$ and $f_c$.

In yet another implementation, rate selector 310 may include a finite-state machine for converting a digitized rate estimate signal RE into control signals $RS_1$ and $RS_2$ using, for example, an appropriate mapping algorithm.

When used in conjunction with, for example, continuous rate detector 301 of FIG. 8, rate correction 1430 and adaptive filter 1440 may improve the accuracy of the line rate estimate, which is received by rate translation 1402. Rate estimate signal RE is applied to input 1432 of rate correction block 1430. Output 1434 from correction block 1430 goes to input 1442 of adaptive filter 1440, input 1462 of rate change detector 1460, and input 1472 of expected rate comparator 1470.

Input 1444 controls the response of filter 1440. Input signal 155 is also applied via node 314 to inputs 1464 and 1474 of rate change detector 1460 and expected rate comparator 1470, respectively. The rate at which operations are performed within rate change detector 1460 and expected rate comparator 1470 may, for example, be controlled by input signal 155 via input 314.

Rate change detector 1460 includes output 1466, and expected rate comparator 1470 includes output 1476. Outputs 1466 and 1476 are combined in summation 1480, and applied to input 1452 of filter control 1450. Filter control 1450 includes output 1454, which is applied to input 1444 of adaptive filter 1440. Adaptive filter output 1446 connects to inputs 1412 and 1422 of function blocks 1410 and 1420, respectively.

Rate estimate signal RE appearing at input 312 of rate detector 301 may include predictable or measured error. Correction block 1430 may implement an algorithm, which compensates for predicted or measured discrepancy between the rate estimate signal RE and the bit rate of input signal 155.

Adaptive filter 1440 outputs a modified rate estimate $RE_F$, which depends on the current value of rate estimate signal RE and the current value's relationship to the past behavior of rate estimate signal RE. Considering the behavior of rate estimate signal RE and modified rate estimate signal $RE_F$ at a set of discrete times, the current and past values of rate estimate signal RE may be represented by the set of values $\{RE_i\}$ while the corresponding values of modified rate estimate signal $RE_F$ may be represented by the set of values $\{RE_{Fj}\}$. Adaptive filter 1440 may, for example, construct modified rate estimate signal $RE_F$ from rate estimate signal RE using the following relationship:

$$RE_{Fk} = \sum_{i=-\infty}^{k} a_{k-i} RE_i + \sum_{j=-\infty}^{k-1} b_{k-j} RE_{Fj}, \quad (15)$$

where $a_i$ and $b_j$ are coefficients which may be programmed through input 1444 subject.

Filter 1440, which includes an implementation of equation 15, reacts rapidly to changing rate estimate signal RE when coefficient $a_1$ is large, and conversely, reacts slowly when coefficients $a_i$ are large for i>>1. Coefficients $b_j$ may be selected to affect persistent memory of a particular estimate. The constraint $$\sum_i a_i = 1$$

may prevent bias in modified rate estimate signal $RE_F$, while the constraint $$\sum_j b_j < 1$$

may avert instability. Coefficients $a_i$ and $b_j$ may be selected based on patterns in the variation of rate estimate signal RE following a correction by rate correction 1430.

Rate change detector 1460 may distinguish small or insignificant fluctuations in rate estimate signal RE, which is applied to input 1462, from rapid or significant changes in the corrected rate estimate. Rate change detector 1460 may construct a histogram of rate change values, and compute the likelihood that a current rate change is significantly different from rate changes in the recent past. The magnitude of output 1466 may reflect the magnitude or duration of a change in the current rate estimate relative to previous changes. The response time for performing rate change discrimination may be set by the rate of transitions at input 1464.

Expected rate comparator 1470 may compare the current rate estimate signal RE with known common line rates or previous values of $\{RE_i\}$, which have persisted for a significant time interval. The magnitude of output 1476 may reflect the proximity of rate estimate signal RE to known rates or previous persistent rates. The response time for comparing rate estimate signal RE against expected rates may be set based on the rate of transitions at input 1464.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for recovering a clock signal from an input signal having a variable bit rate, said method comprising the steps of:

estimating a minimum time interval between transitions in the input signal;

determining a center frequency of a narrow-band filter based on the estimated minimum time interval; and extracting, at the determined center frequency, the clock signal from the input signal.

2. The method of claim 1 further comprises the steps of:

before the extracting step, generating a first plurality of pulses corresponding respectively to transitions in the input signal;

adjusting the duration of each of the first plurality of pulses based on the estimated minimum time interval; and inputting into the narrow-band filter the adjusted first plurality of pulses.

3. The method of claim 1, wherein the estimating step further comprises the step of:

determining the variable bit rate of the input signal based on the estimated minimum time interval.

4. The method of claim 2, wherein the estimating step comprises the steps of:

generating a second plurality of pulses that correlate to the transitions in the input signal; and adjusting the duration of each of the second plurality of pulses, such that minimum time intervals between the transitions in the input signal match the durations of the corresponding second plurality of pulses.

5. The method of claim 2, wherein the extracting step comprises the steps of:

generating a phase correction signal proportional to a difference between a phase of the clock signal and a phase of the first plurality of pulses; and adding the phase correction signal to a center frequency of an oscillator generating the clock signal.

6. The method of claim 2, wherein the extracting step comprises the steps of:

generating a frequency correction signal proportional to a difference between a frequency of the clock signal and a frequency of the first plurality of pulses; and adding the frequency correction signal to a center frequency of an oscillator generating the clock signal.

7. The method of claim 4, wherein the adjusting step of claim 4 comprises the steps of:

generating a voltage signal corresponding to the difference between the minimum time interval between transitions in the input signal and the duration of the corresponding second plurality of pulses; and generating a current signal proportional to the voltage signal, wherein the current signal controls the durations of each of the second plurality of pulses.

8. A method for re covering a clock signal from an input signal having a variable bit rate, said method comprising the steps of:

estimating a minimum time interval between transitions in the input signal;

generating a first plurality of pulses corresponding respectively to transitions in the input signal;

adjusting duration of each of the first plurality of pulses based on the estimated minimum time interval and inputting into a narrow-band filter the adjusted first plurality of pulses;

determining a center frequency of the narrow-band filter based on the estimated minimum time interval; and extracting in the narrow-band filter the clock signal from the adjusted first plurality of pulses.

9. The method of claim 8, wherein the estimating step comprises the steps of:

generating a set of delayed input signals by passing the input signal serially through a set of delay segments, wherein the set of delay segments delay the input signal based on a set of predetermined delay times, respectively;

comparing the input signal with the set of generated delayed input signals to determine which of the predetermined delay times are less than the minimum time interval between transitions in the input signal; and generating a control signal based on a sum of the predetermined delay times that are less than the minimum time interval between transitions in the input signal.

10. The method of claim 8, wherein the estimating step comprises the steps of:

generating a set of delayed input signals by passing the input signal serially through a set of programmable delay segments, wherein the set of programmable delay segments delay the input signal based on a set of pre-determined delay times, respectively;

comparing the input signal with the set of generated delayed input signals to determine which of the pre-determined delay times are less than the minimum time interval between transitions in the input signal; and generating a control signal based on a sum of the pre-determined delay times that are less than the minimum time interval between transitions in the input signal.

11. The method of claim 8, wherein the estimating step comprises the steps of:

generating one or more delayed transitions by passing the input signal through a programmable time interval generator, wherein said one or more delayed transitions are generated based on a set of delay time values, respectively;

comparing transitions in the input signal with the generated delayed transitions; and adjusting one or more of the delay time values, such that one of the delay time values matches the minimum time interval between transitions in the input signal.

12. An apparatus for recovering a clock signal from an input signal having a variable bit rate, said apparatus comprising:

a rate detector for estimating a minimum time interval between transitions in the input signal;

a transition detector for generating a first plurality of pulses corresponding respectively to transitions in the input signal;

a narrow-band filter for extracting the clock signal from an adjusted first plurality of pulses; and a rate selector for adjusting, based on the estimated minimum time interval, duration of each of the first plurality of pulses and a center frequency of the narrow-band filter that receives the adjusted first plurality of pulses.

13. The apparatus of claim 12, wherein said rate detector comprises:

a set of delay segments connected in series for generating a set of delayed input signals based on a set of pre-determined delay times, respectively; and a set of latches connected to the set of delay segments, respectively, for comparing the set of delayed input signals with the input signal to determine which of the pre-determined delay times are less than the minimum time interval between transitions in the input signal and generating a control signal based on a sum of the pre-determined delay times that are less than the minimum time interval between transitions in the input signal.

14. The apparatus of claim 12, wherein said rate detector comprises:

a programmable time interval generator for generating a set of delayed transitions based on a set of delay time values, respectively; and an edge transition comparator connected to the programmable time interval generator for comparing the set of delayed transitions with transitions in the input signal and adjusting one or more of the delay time values, such that one of the delay time values matches the minimum time interval between the transitions in the input signal.

15. The apparatus of claim 12 further comprises:

a calibration source for generating a calibration signal having a set of pre-determined reference bit rates, wherein the rate detector estimates the pre-determined reference bit rate of the calibration signal; and a response monitor for determining differences between the pre-determined reference bit rates and the estimated pre-determined reference bit rate and for adjusting the rate selector until one of determined differences equals zero.

16. The apparatus of claim 12, wherein the rate detector comprises:

an interval generator for generating a second plurality of transitions that correlate to the transitions in the input signal;

a transition comparator for determining a difference between the duration of each of the second plurality of transitions and a time interval between each of the transitions in the input signal; and a feedback means for adjusting the duration of each of the second plurality of transitions until the determined difference equals zero.

17. The apparatus of claim 12, wherein the narrow-band filter comprises:

a phase comparator for generating a phase correction signal proportional to a difference between a phase of the clock signal and a phase of the adjusted first plurality of pulses; and a first adder for adding the phase correction signal to a center frequency of an oscillator generating the clock signal.

18. The apparatus of claim 17, wherein the narrow-band filter further comprises:

a frequency comparator for generating a frequency correction signal proportional to a difference between a frequency of the clock signal and a frequency of the adjusted first plurality of pulses; and a second adder for adding the frequency correction signal to the center frequency of the oscillator generating the clock signal.

19. The apparatus of claim 16, wherein the interval generator comprises:

an edge triggered one-shot for generating the second plurality of pulses that correlate to the transitions in the input signal.

20. The apparatus of claim 16, wherein the interval generator comprises:

one or more resettable edge triggered delay elements for generating the second plurality of pulses that correlate to the transitions in the input signal.

21. An apparatus for recovering a clock signal from an input signal having a variable bit rate, said apparatus comprising:

a rate detector for estimating a minimum time interval between transitions in the input signal;

a rate selector connected to the rate detector;

a transition detector connected to the rate selector; and a narrow-band filter connected to the transitions detector and the rate selector, such that the rate selector adjusts, based on the estimated minimum time interval, duration of each of a plurality of pulses generated by the transition detector and a center frequency of the narrow-band filter for extracting the clock signal from the input signal.

* * * * *

UNITED STATES PATENT AND TRADEMARK OFFICE
CERTIFICATE OF CORRECTION

PATENT NO. : 6,285,722 B1
DATED : September 4, 2001
INVENTOR(S) : Thomas C. Banwell and Nim K. Cheung It is certified that error appears in the above-identified patent and that said Letters Patent is hereby corrected as shown below:

Drawings,
Figure 4, add reference numbers 422 and 424 for "input ports of selectors".

Column 2,
Line 30, change "Frequency comparator 220" to -- Frequency comparator 260 --.
Line 39, change "phase comparator 120" to -- phase comparator 220 --.

Column 7,
Line 12, change "delay element $514_N$" to -- delay element $510_N$ --.

Column 9,
Line 33, change "fixed current source $I_{730}$" to -- $I_{732}$ --.

Column 13,
Line 18, change "$V_{1048}$" to -- $V_{1038}$ --.

Column 14,
Line 42, change "$I_{1017}$" to -- $I_{1016}$ --.
Line 58, change "$C_{1165}$" to -- $C_{1164}$ --.

Column 15,
Line 4, change "$C_{1112}$" to -- $C_{1164}$ --.
Line 8, change "node 1185" to -- node 1165 --.

Column 17,
Line 41, change "second stage($Q_1$)" to -- second stage($Q_2$) --.
Line 61, change ""Set" inputs 1312 and 1324" to -- "Set" inputs 1312 and 1322 --.

UNITED STATES PATENT AND TRADEMARK OFFICE
CERTIFICATE OF CORRECTION

PATENT NO.    : 6,285,722 B1
DATED         : September 4, 2001
INVENTOR(S)   : Thomas C. Banwell and Nim K. Cheung It is certified that error appears in the above-identified patent and that said Letters Patent is hereby corrected as shown below:

<u>Column 18,</u>
Line 7, change "Second stage($Q_1$)" to -- Second stage($Q_2$) --.
Line 15, change "$Q_1$" to -- $Q_2$ --.

Signed and Sealed this

Twenty-fourth Day of December, 2002

JAMES E. ROGAN
*Director of the United States Patent and Trademark Office*